United States Patent
Frye et al.

(10) Patent No.: US 9,815,387 B2
(45) Date of Patent: Nov. 14, 2017

(54) SEAT ADJUSTER

(71) Applicant: Faurecia Automotive Seating, LLC, Auburn Hills, MI (US)

(72) Inventors: Dale J Frye, West Olive, MI (US); Jeffery T Bonk, Chesterfield, MI (US); Jared A Judson, Medford, MA (US); Timothy L Moulton, Newport, RI (US)

(73) Assignee: Faurecia Autmotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/079,730

(22) Filed: Mar. 24, 2016

(65) Prior Publication Data

US 2016/0280095 A1    Sep. 29, 2016

Related U.S. Application Data

(63) Continuation-in-part of application No. PCT/US2015/022679, filed on Oct. 1, 2015.

(60) Provisional application No. 62/137,638, filed on Mar. 24, 2015.

(51) Int. Cl.
*B60N 2/02* (2006.01)
*B60N 2/20* (2006.01)
*B60N 2/06* (2006.01)

(52) U.S. Cl.
CPC ............ *B60N 2/0244* (2013.01); *B60N 2/06* (2013.01); *B60N 2/206* (2013.01); *B60N 2002/0268* (2013.01)

(58) Field of Classification Search
None
See application file for complete search history.

(56) References Cited

U.S. PATENT DOCUMENTS

| | | | | |
|---|---|---|---|---|
| 6,157,372 A * | 12/2000 | Blackburn | .......... | G06F 3/04883 345/157 |
| 7,156,442 B2 * | 1/2007 | McManus | ................ | B60N 2/06 296/65.09 |
| 7,667,345 B2 | 2/2010 | Budweg et al. | | |
| 7,870,496 B1 * | 1/2011 | Sherwani | ................ | H04L 67/38 715/718 |
| 2007/0235297 A1 * | 10/2007 | Stoschek | .............. | B60N 2/0228 200/5 R |

(Continued)

FOREIGN PATENT DOCUMENTS

| DE | 10353020 | 6/2005 |
|---|---|---|
| EP | 1602797 | 12/2005 |

(Continued)

OTHER PUBLICATIONS

International Search Report and Written Opinion, International Application No. PCT/US2015/022679, dated Aug. 31, 2015, 16 pages.

*Primary Examiner* — Nicholas Kiswanto
*Assistant Examiner* — Tamara Weber
(74) *Attorney, Agent, or Firm* — Barnes & Thornburg LLP

(57) ABSTRACT

A vehicle seat may be adjusted to reposition the vehicle seat within a vehicle or a seat back with respect to a seat bottom of the vehicle seat. The vehicle seat may slide longitudinally relative to a floor of the vehicle. The seats back may fold toward or away from the seat bottom and the seat bottom may fold toward or away from the vehicle floor. Adjustments may be initiated electronically or manually.

21 Claims, 14 Drawing Sheets

(56) References Cited

U.S. PATENT DOCUMENTS

| | | | | |
|---|---|---|---|---|
| 2009/0088930 A1* | 4/2009 | Ohtsubo | ............... | B60N 2/0252 701/49 |
| 2014/0265477 A1* | 9/2014 | Yetukuri | ............... | B60N 2/0228 297/217.3 |
| 2014/0265479 A1* | 9/2014 | Bennett | ................. | B60N 2/502 297/217.4 |

FOREIGN PATENT DOCUMENTS

| | | |
|---|---|---|
| EP | 1849647 | 10/2007 |
| FR | 2982542 | 5/2013 |
| WO | 2012/082052 | 6/2012 |
| WO | 2012/161094 | 11/2012 |

* cited by examiner

SEAT ADJUSTER

PRIORITY CLAIM

This application is a continuation-in-part of PCT/US2015/022,679, filed Oct. 1, 2015, and claims priority under 35 U.S.C. §119(e) to U.S. Provisional Application Ser. No. 62/137,638, filed Mar. 24, 2015, each of which is expressly incorporated by reference herein.

BACKGROUND

The present disclosure relates to vehicle seats, and in particular to vehicle seats movable within a vehicle. More particularly, the present disclosure relates to vehicle seats and a computerized system and method that moves the vehicle seats to desired positions and orientations in response to a user input.

SUMMARY

According to the present disclosure, a vehicle seat can typically be repositioned within a vehicle or a seat back of the vehicle seat can be adjusted with respect to a seat bottom of the vehicle seat. Seats may slide longitudinally to position a driver of the vehicle comfortably in front of the steering wheel, provide occupants with sufficient leg room, or accommodate cargo. Seats backs may fold toward or away from seat bottoms and seat bottoms may fold toward or away from the vehicle floor, for example, to facilitate occupant entry into the vehicle and to accommodate cargo and passenger comfort. Additional adjustments may be made to headrests, lumbar supports and temperatures of the seats, for example. Adjustments may be electronically-initiated using switches, buttons, or levers.

In illustrative embodiments, a gesture-adjustment system accepts gesture-based inputs on front, rear, or side surfaces of vehicle seat backs or vehicle seat bottoms to reposition the vehicle seat. Gesture-based inputs may include, for example, tapping gestures (e.g., single-tap, double-tap, etc.), press-and-hold gestures, swiping gestures (e.g., single-swipe, double-swipe, hooked-swipe, etc.), and other gestures.

In illustrative embodiments, the gesture-adjustment system includes sensors, for example in vehicle seats, that accept gesture-based inputs from a user seeking to adjust the vehicle seats in a desired manner Different gestures applied by the user to the vehicle seat results in different respective vehicle seat adjustments. The gesture-adjustment system determines the desired vehicle seat adjustments by analyzing signals generated by sensors that have detected the gesture-based input. The intended gesture is mapped to a seat adjustment using a lookup table or other database from which gestures can be referenced to a selection of seat adjustments. The gesture-adjustment system transmits the vehicle adjustment signal to an actuation unit, which causes the vehicle seats or parts thereof to move in accordance with the desired vehicle seat adjustments.

In illustrative embodiments, the gesture-adjustment system operates in different modes depending on the current status of the vehicle, including a transit-mode for when the vehicle is moving, a passenger-entry mode for when passengers are entering the vehicle, and a cargo-loading mode for when a user is loading cargo into the vehicle. The different modes enable the gesture-adjustment system to select vehicle seat adjustments that are appropriate for the current status of the vehicle. The gesture-adjustment system may also consider the presence of obstacles and passengers when initiating a suitable adjustment.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1A and 1B are a series of side perspective views of a vehicle showing scenarios in which users invoke a gesture-adjustment process performed by a gesture-adjustment system to move vehicle seats included in the vehicle in order to better accommodate passengers entering the vehicle and in order to better accommodate cargo being loaded into the vehicle;

FIG. 1A is a side perspective view of the vehicle suggesting that a first user applies a double-tap gesture to a rear surface of a seat back of a second-row vehicle seat to move the second-row vehicle seat forward longitudinally to accommodate entry and occupancy of a passenger in a third-row vehicle seat and further suggesting that a second user applies a double-swipe gesture to a rear surface of a seat back of a third-row vehicle seat to pivot the seat back of the third-row vehicle seat downwards to accommodate cargo that will be partially stowed on top of the seat back of the third-row vehicle seat;

FIG. 1B is a view similar to FIG. 1A showing that the second-row vehicle seat has moved forward longitudinally to accommodate entry and occupancy of the passenger in a third-row vehicle seat in response to the double-tap gesture of FIG. 1A and further showing that the seat back of a third-row vehicle seat has pivoted downwards in response to the double-swipe gesture of FIG. 1A to accommodate cargo being stowed on top of the seat back of the third-row vehicle seat;

FIG. 2 is a diagrammatic view of a gesture-adjustment process in accordance with the disclosure showing that the gesture-adjustment process is performed by a gesture-adjustment system including sensors, a gesture controller, and an actuation unit, and suggesting that the gesture-adjustment process includes the steps of accepting gesture-based inputs, processing signals from sensors, identifying gesture-determining characteristics based on the processed signals, determining intended gestures based on the gesture-determining characteristics, mapping the intended gestures to vehicle seat adjustments to be implemented by the gesture-adjustment system, encoding a vehicle adjustment signal reflecting the adjustments to be implemented, and transmitting the vehicle adjustment signal to the actuation unit for actuation of vehicle seats in accordance with the adjustments;

FIG. 3A is a side view of a vehicle seat that may occupy different respective longitudinal memory positions depending on gesture-based inputs and suggests that a single-tap gesture applied to a rear surface of the seat back results in the vehicle seat moving forward longitudinally to a next sequential memory position;

FIG. 3B is a side view of the vehicle seat of FIG. 3A suggesting that a double-tap gesture applied to a rear surface of the seat back results in the vehicle seat moving forward longitudinally to a full-forward position;

Figure 2:
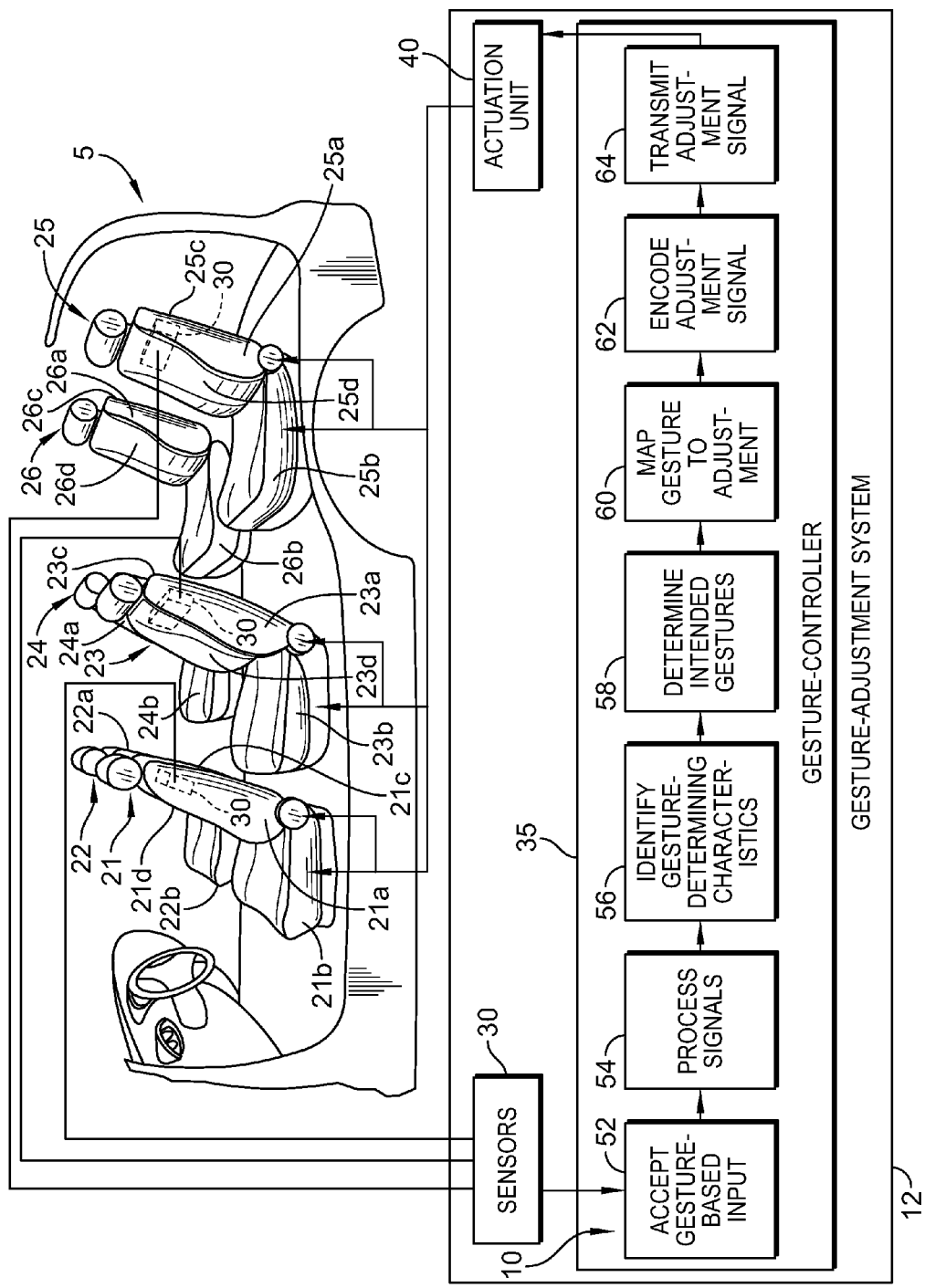
Figure 3A:
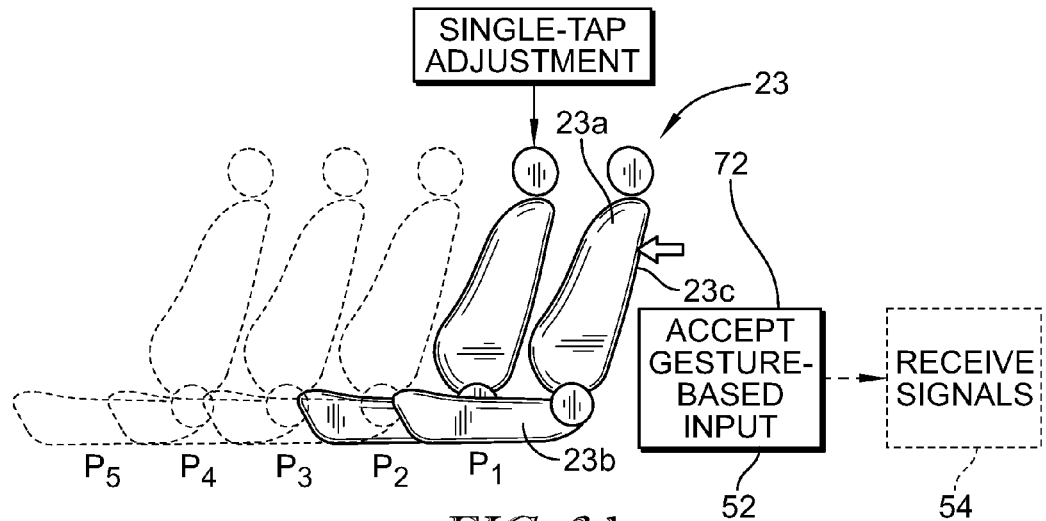
FIGS. 3A-3C are a series of side views of a vehicle seat suggesting that the vehicle seat may occupy different respective longitudinal memory positions depending on gesture-based inputs and suggesting that different types of forward-motion gestures applied to a rear surface of a seat back of the vehicle seat result in different respective types of seat adjustments.
Figure 3B:
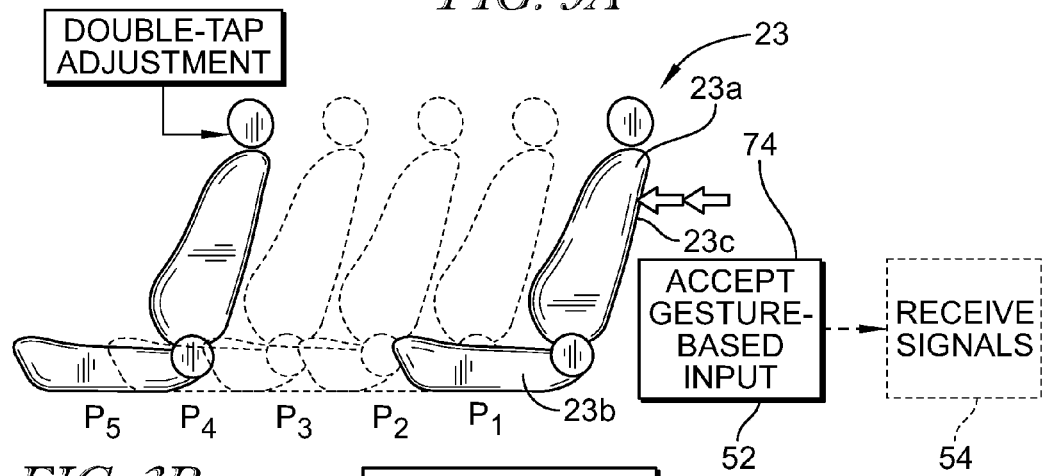
Figure 3C:
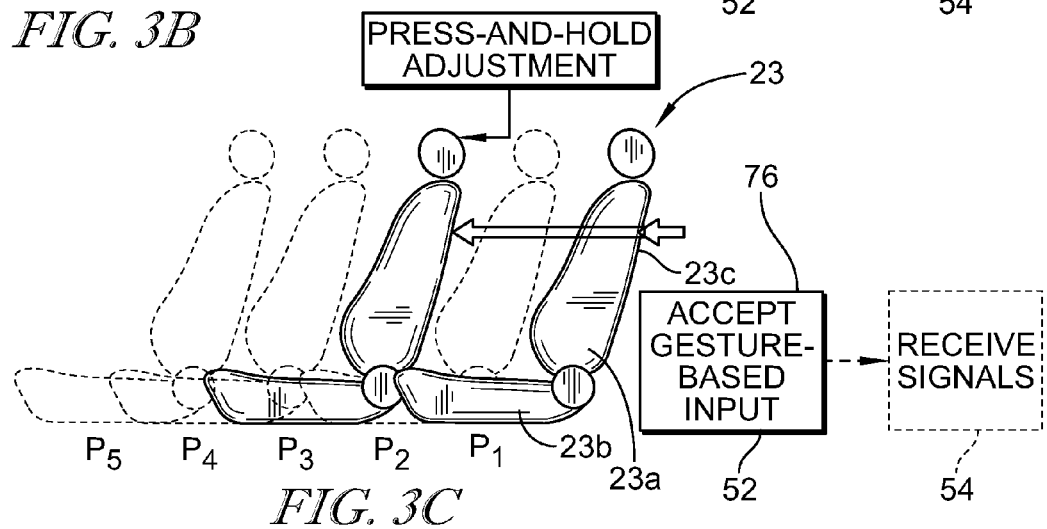
Figure 4A:
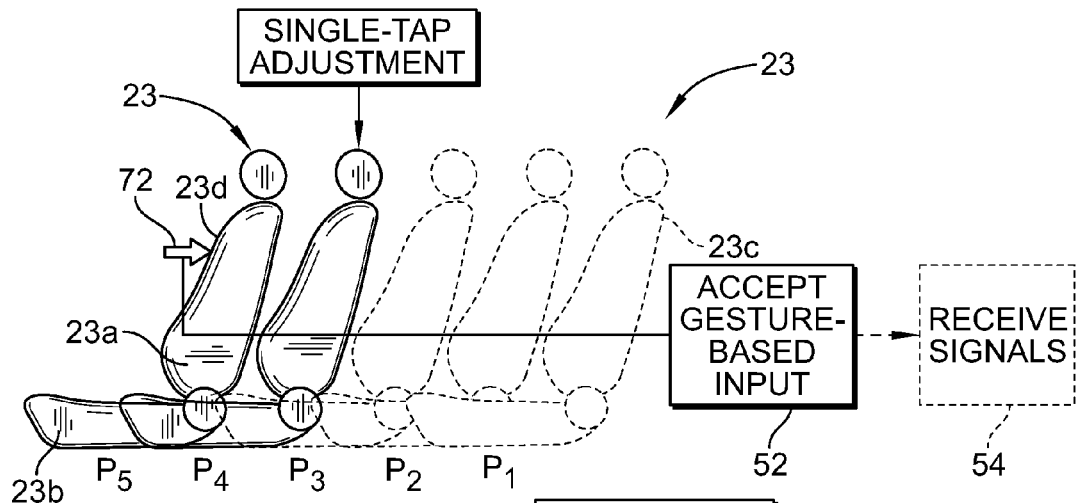
Figure 4B:
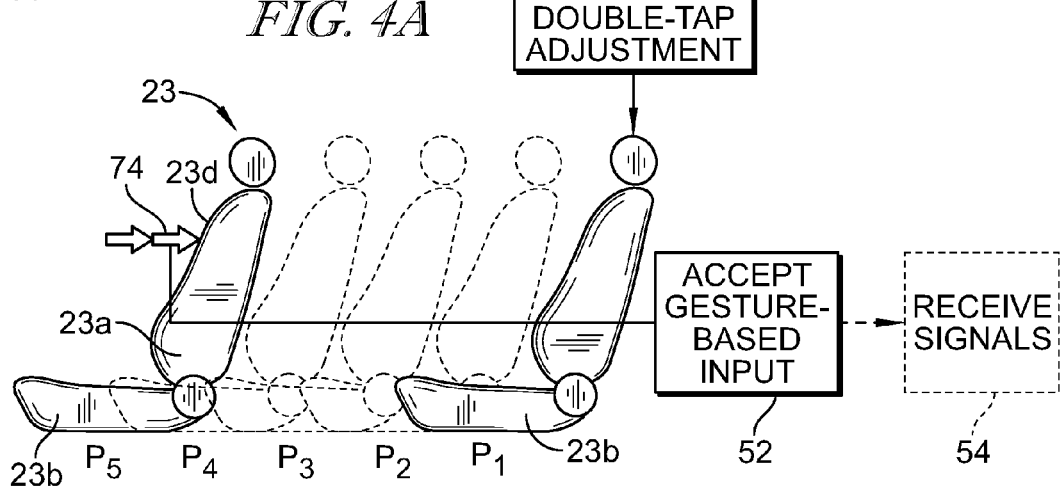
Figure 4C:
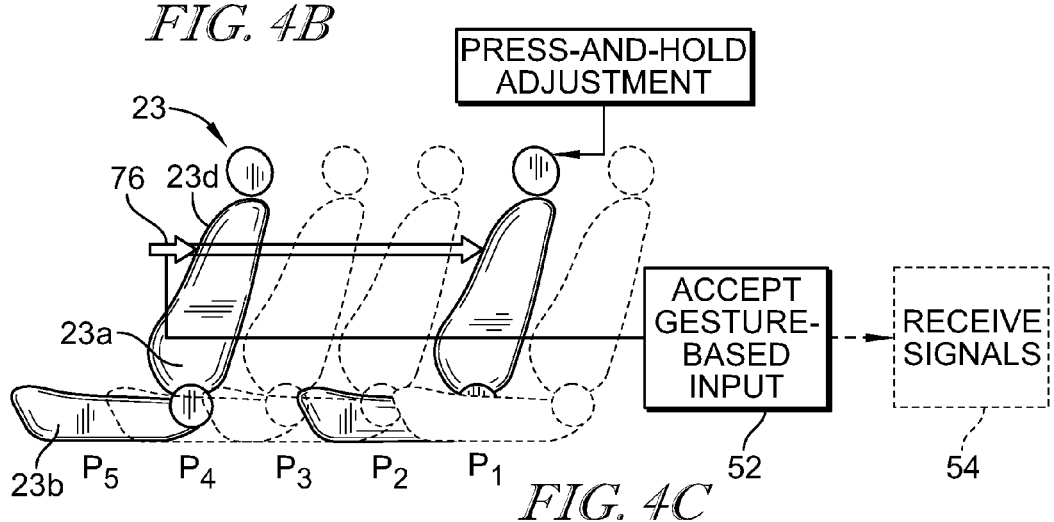
Figure 5A:
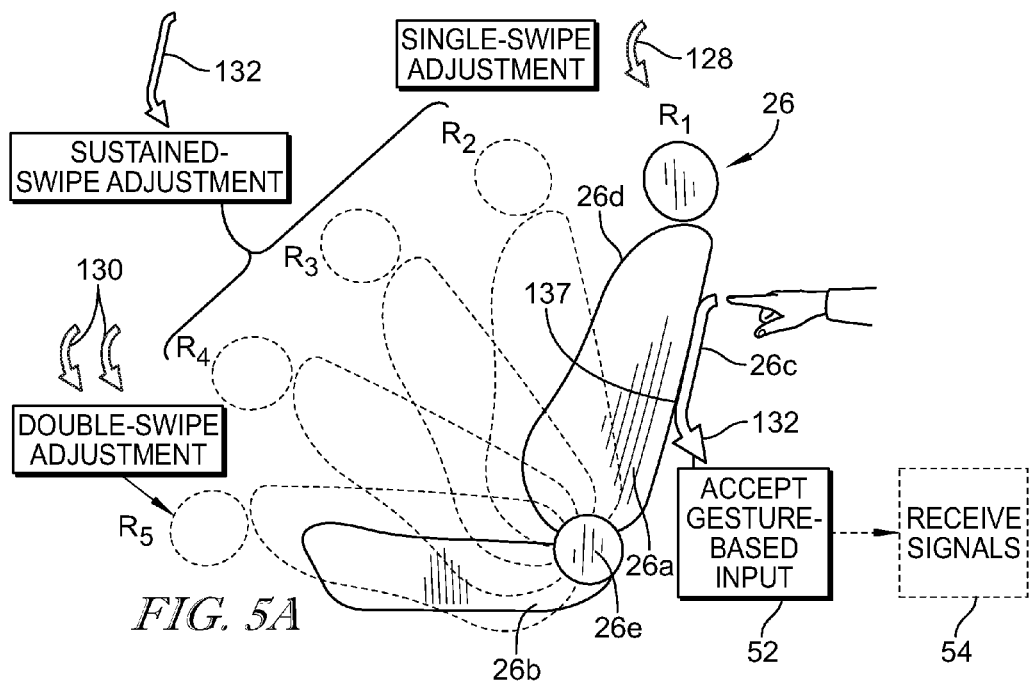
Figure 5B:
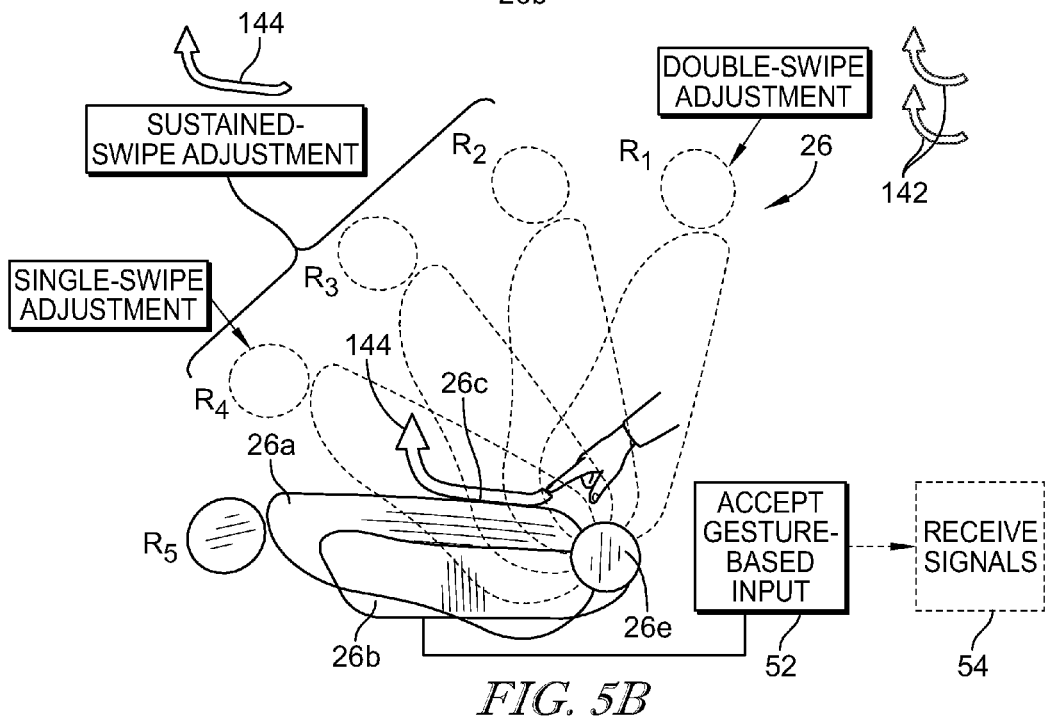
Figure 6:
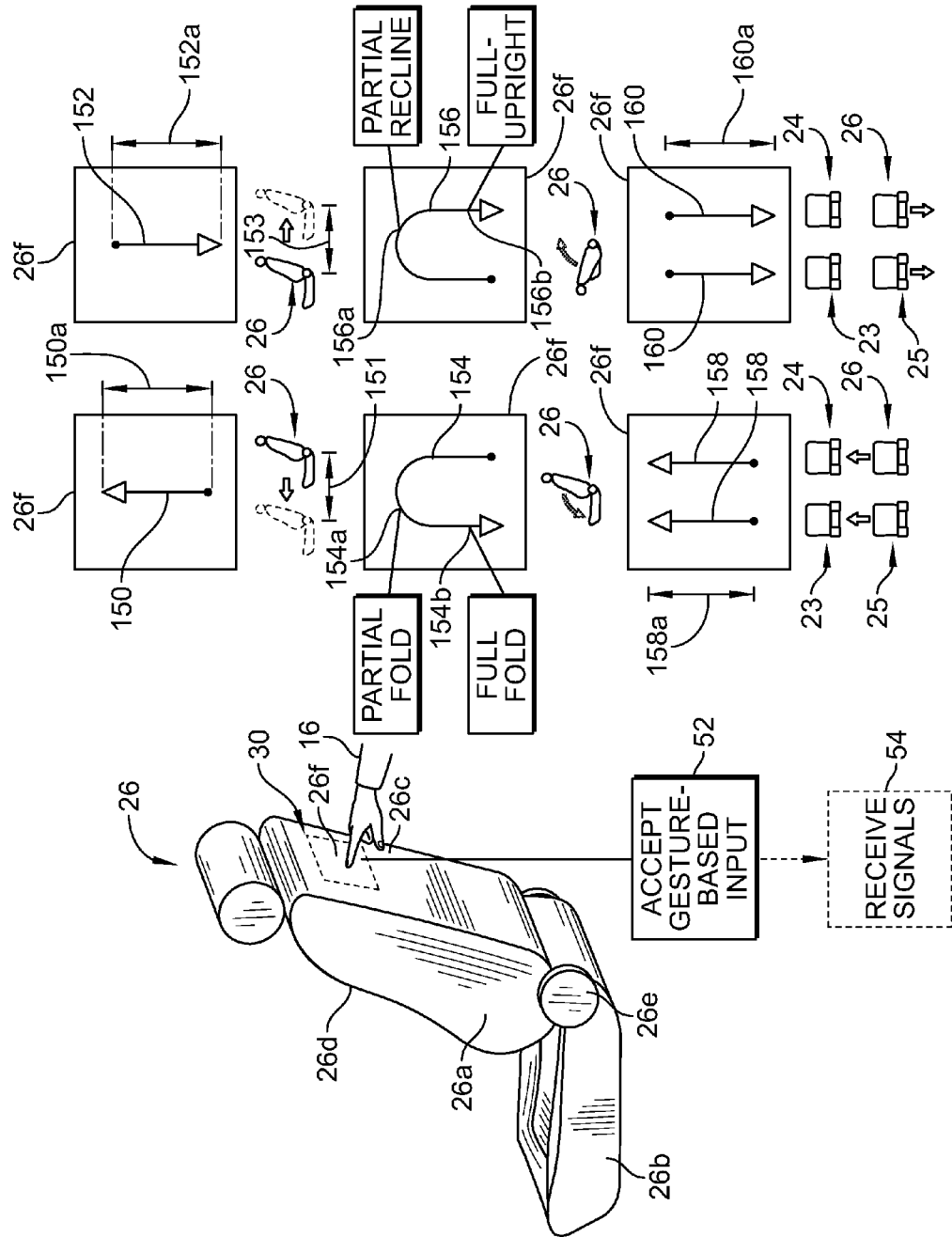
Figure 7:
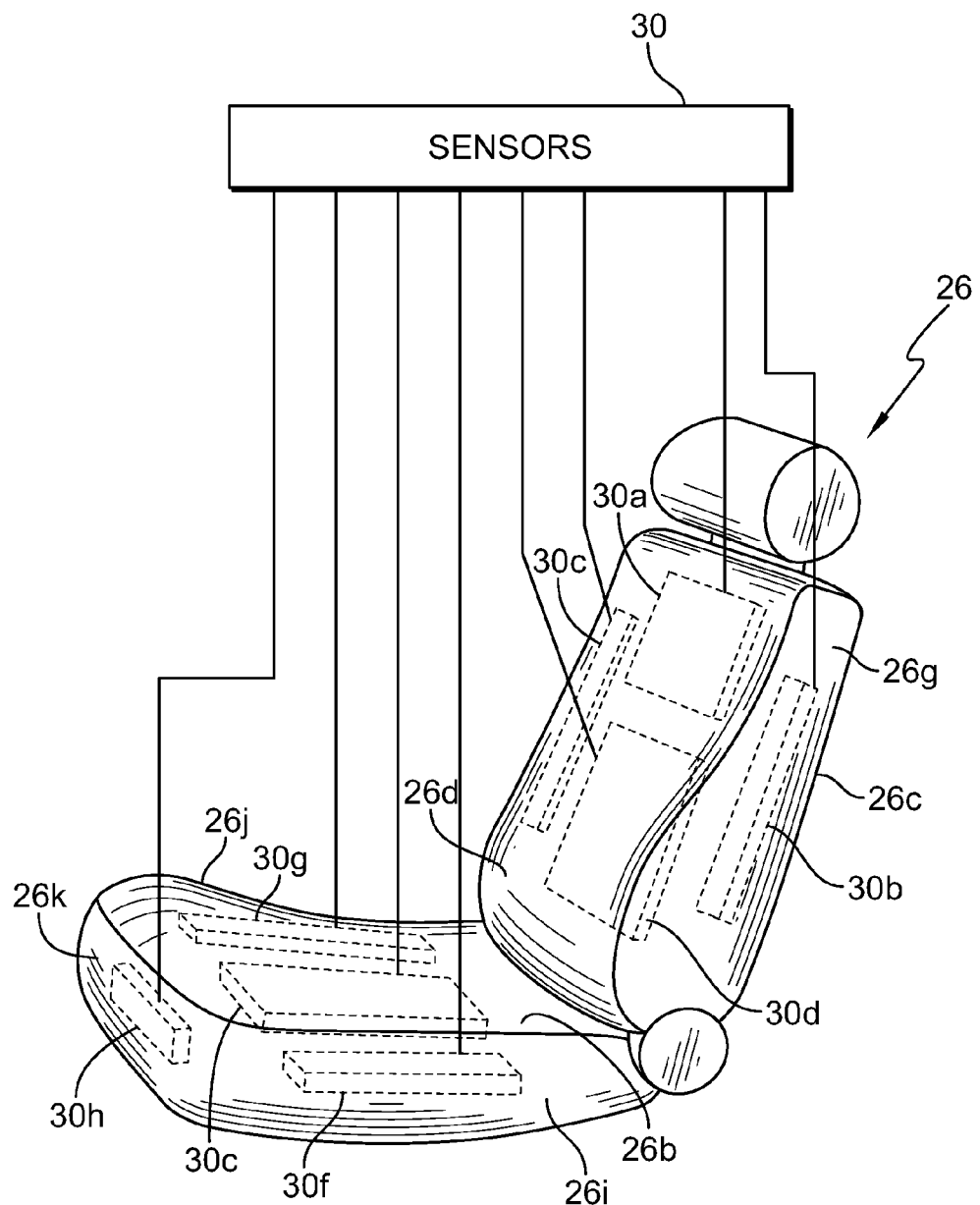
Figure 8:
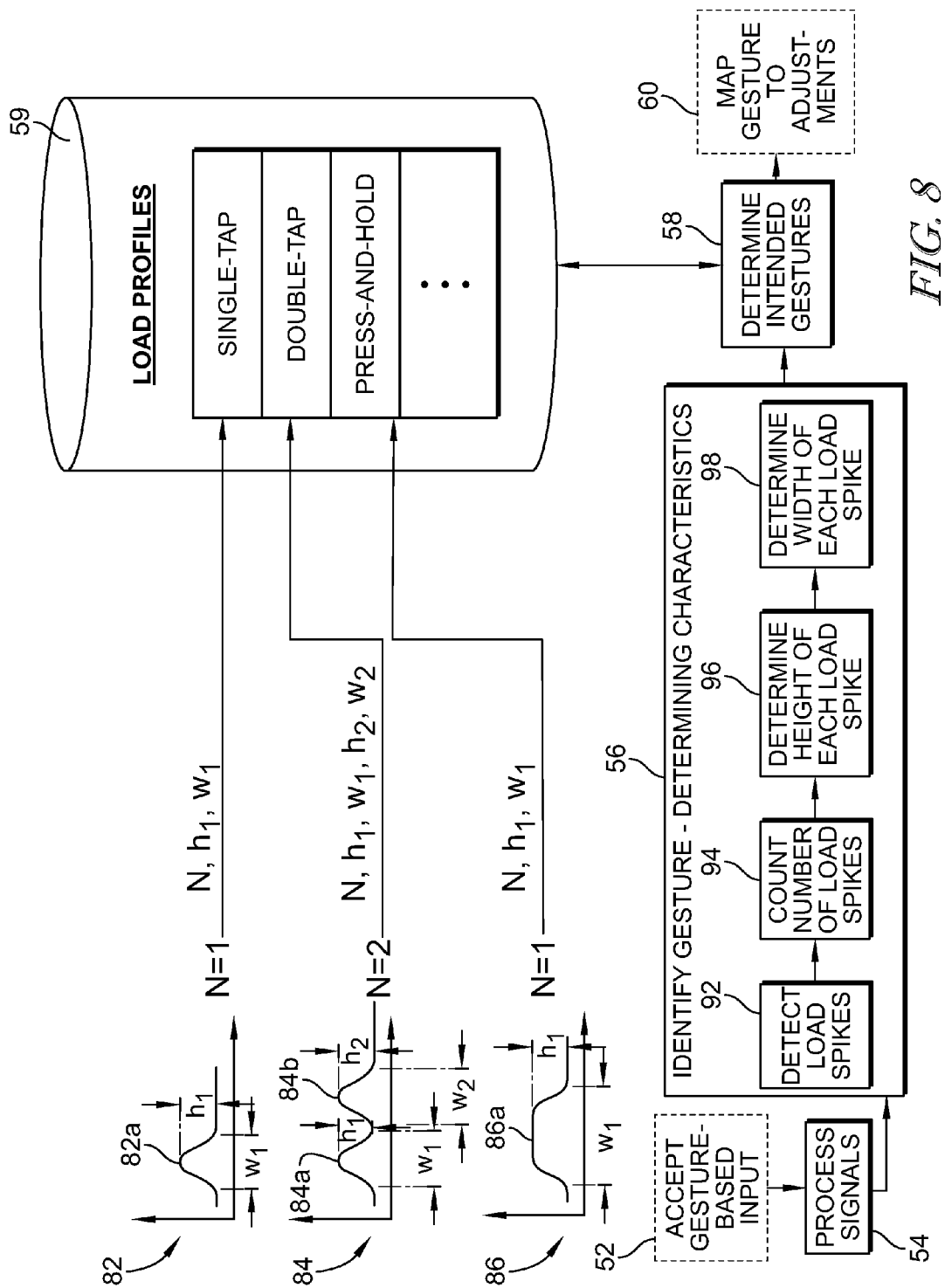
Figure 9:
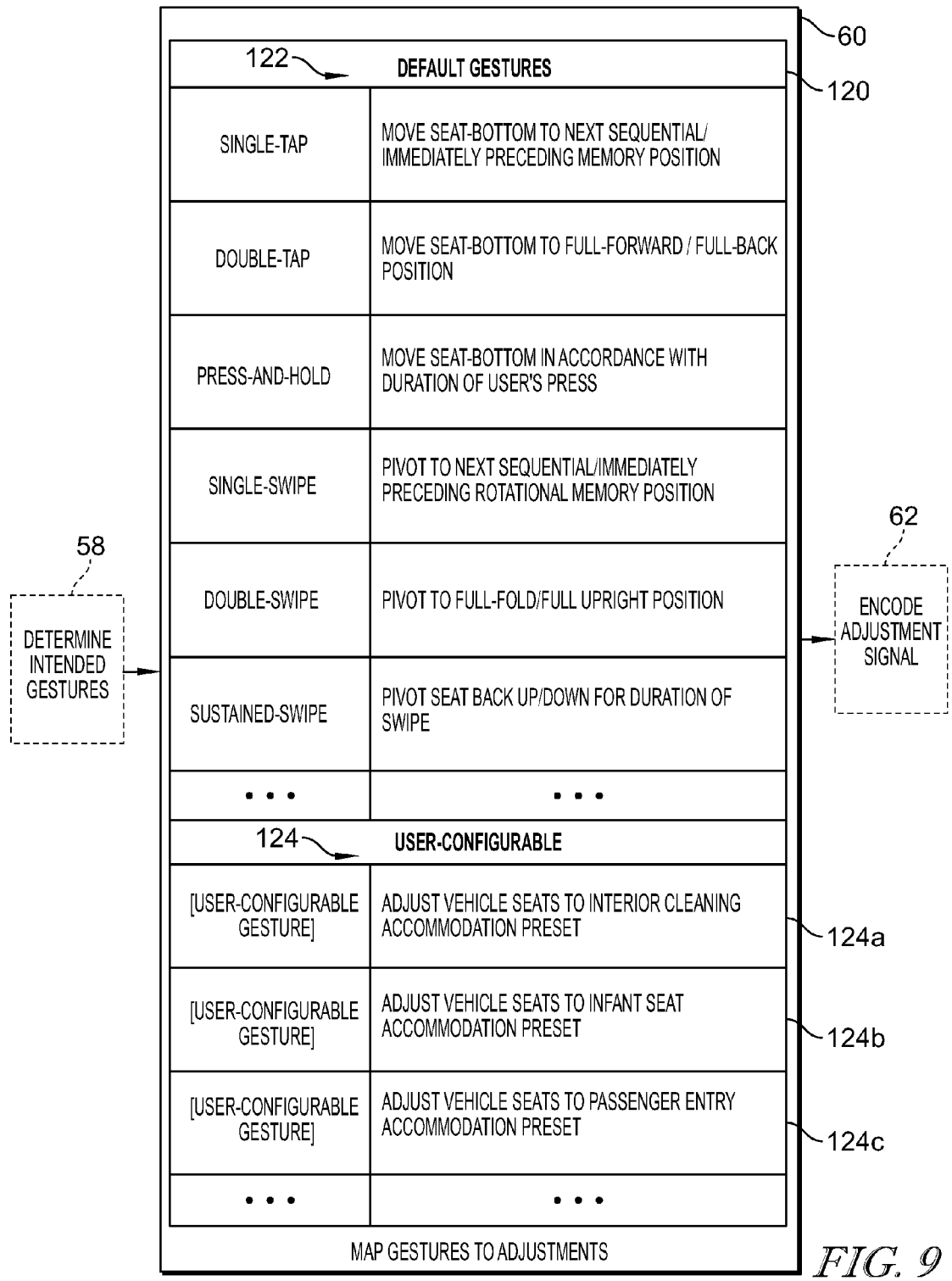
Figure 10:
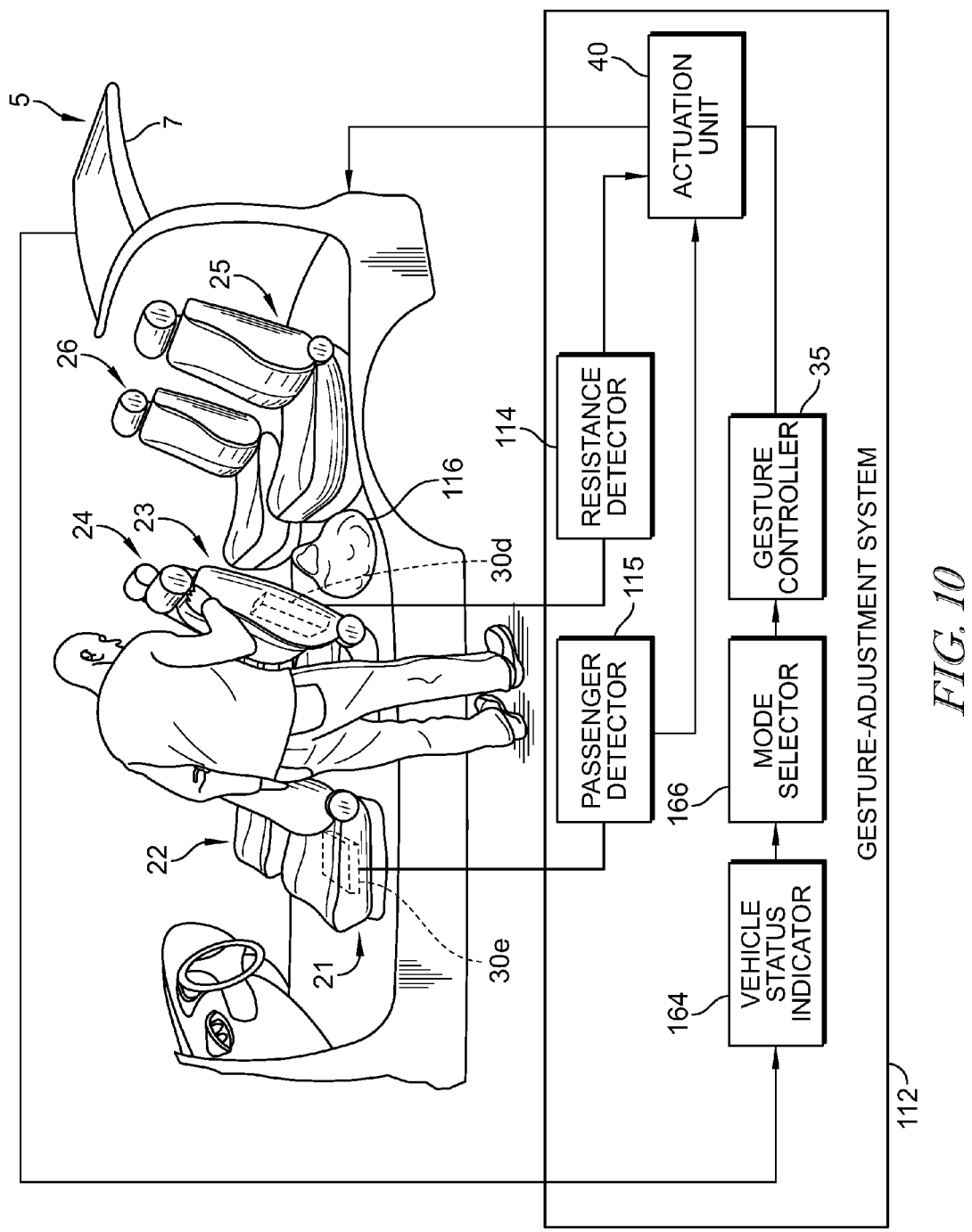
Figure 11:
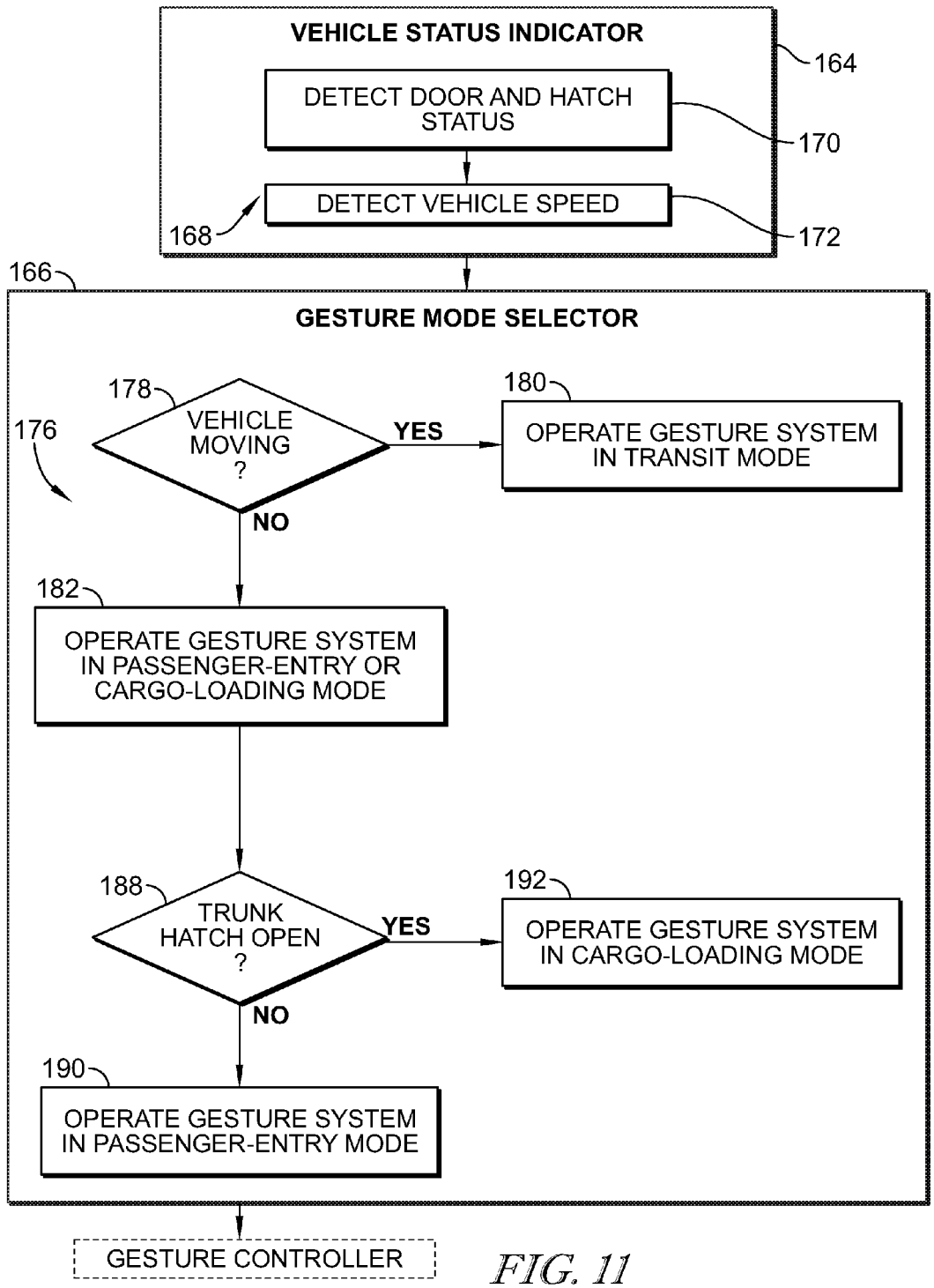
Figures 12A, 12B, 12C:
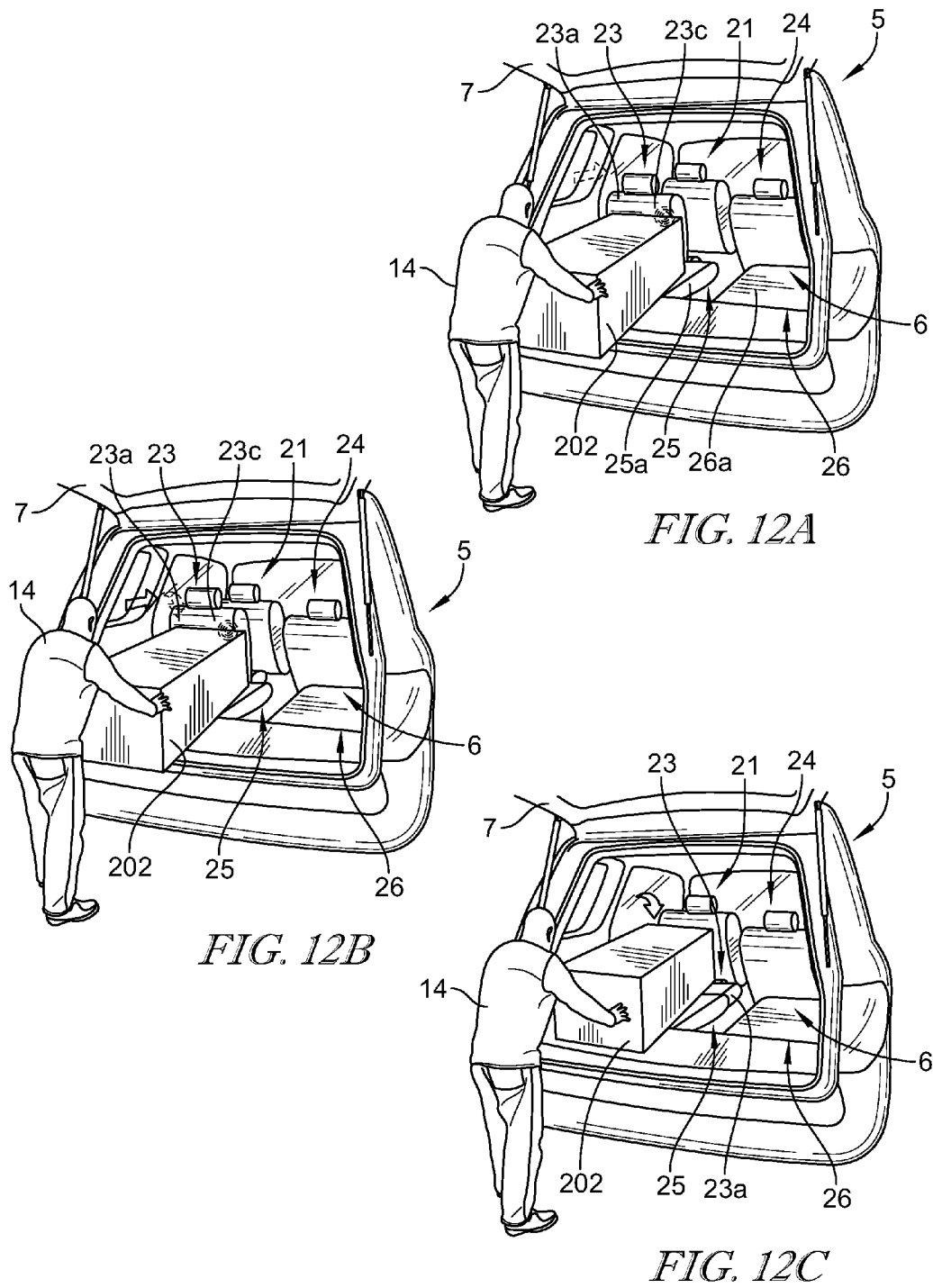
Figure 13:
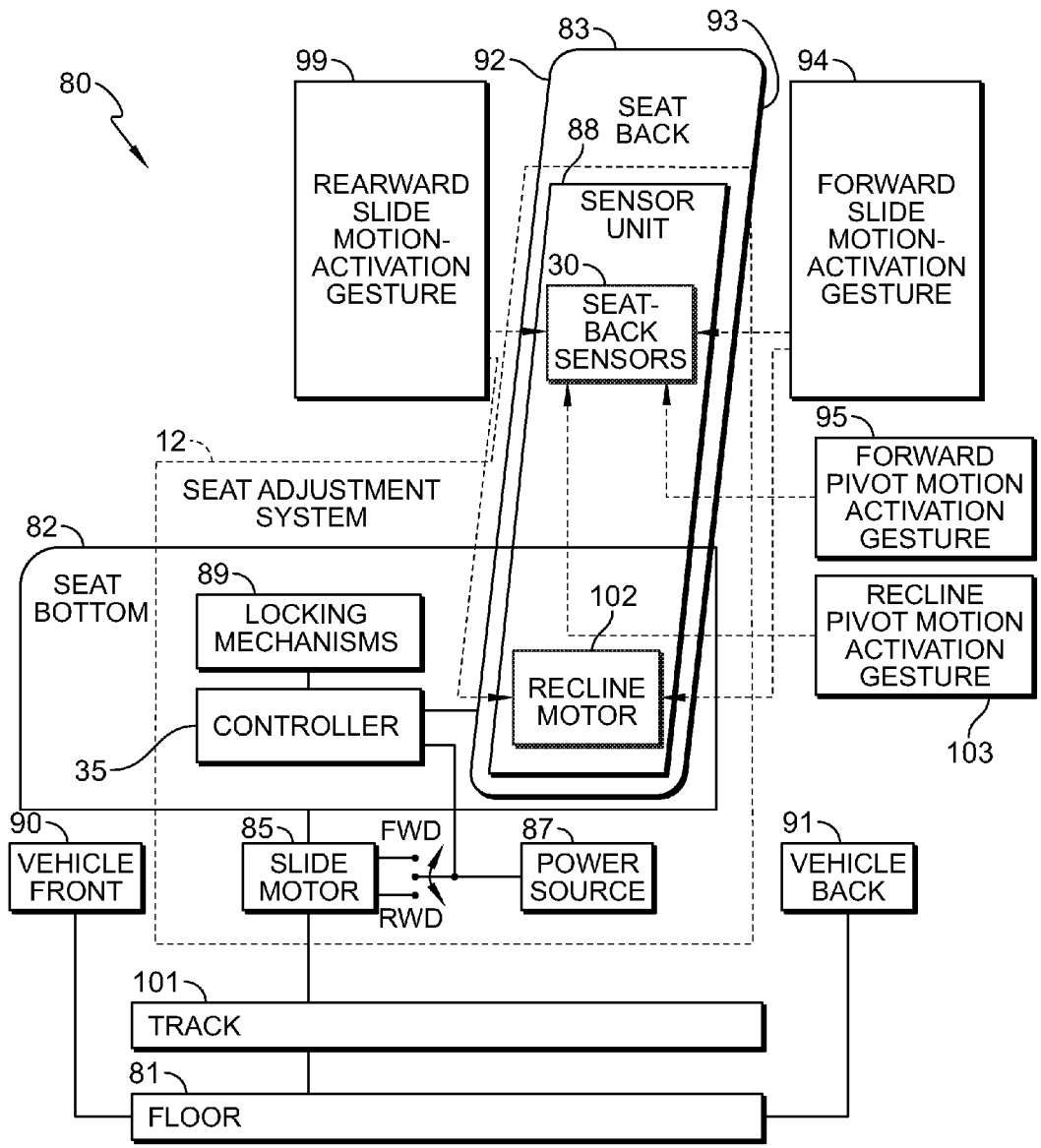
Figure 14:
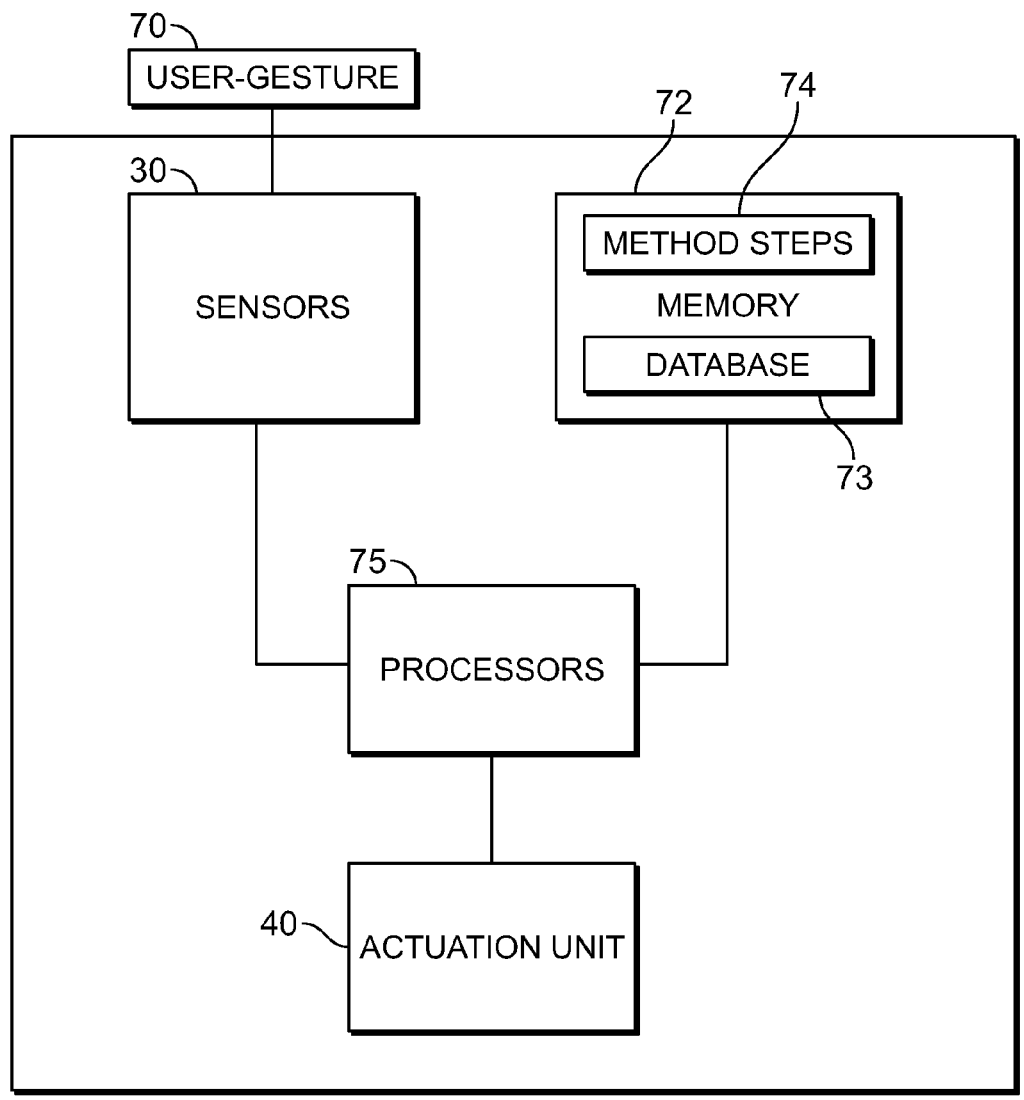

FIG. 3C is a side view of the vehicle seat of FIGS. 3A and 3B suggesting that the vehicle seat moves forward longitudinally in response to a press-and-hold gesture applied to a rear surface of the seat back for the duration of time that the user presses against the rear surface of the seat back and stops moving forward longitudinally in response to the user releasing pressure to the rear surface of the seat back;

FIGS. 4A-4C are a series of views similar to FIGS. 3A-3C suggesting that different types of backward-motion gestures applied to a front surface of the seat back of the vehicle seat result in different respective types of seat adjustments;

FIG. 4A is a side view of a vehicle seat that may occupy different respective longitudinal memory positions depending on gesture-based inputs and suggesting that a single-tap gesture applied to the front surface of the seat back results in the vehicle seat moving backward longitudinally to an immediately preceding memory position;

FIG. 4B is a side view of the vehicle seat of FIG. 4A suggesting that a double-tap gesture applied to the front surface of the seat back results in the vehicle seat moving to a full-back position;

FIG. 4C is a side perspective view of the vehicle seat of FIGS. 4A and 4B suggesting that the vehicle seat moves backward longitudinally in response to a press-and-hold gesture applied to the front surface of the seat back for the duration of time that the user presses against the front surface of the seat back and stops moving longitudinally backward in response to the user releasing pressure on the front surface of the seat back;

FIGS. 5A and 5B are a series of side views of a vehicle seat showing that a seat back of the vehicle seat may occupy different respective rotational memory positions depending on gesture-based inputs and suggesting that different types of swiping gestures applied to a rear surface of the seat back result in different respective types of seat back pivoting adjustments;

FIG. 5A is a side view of a vehicle seat having a seat back that may occupy different respective rotational memory positions depending on gesture-based inputs suggesting that a single-swipe downward gesture applied to a rear surface of the seat back results in the seat back pivoting down to a next sequential rotational memory position, a double-swipe downward gesture applied to a rear surface of the seat back results in the seat back pivoting down to a full-fold position, and a sustained-swipe downward gesture applied to a rear surface of the seat back results in the seat back pivoting down for the duration of time that the user drags a finger down the rear surface of the seat back;

FIG. 5B is a side view of the vehicle seat of FIG. 5A suggesting that a single-swipe upward gesture applied to a rear surface of the seat back results in the seat back pivoting up to an immediately preceding rotational memory position, a double-swipe upward gesture applied to a rear surface of the seat back results in the seat back pivoting up to a full-upright position, and a sustained-swipe upward gesture applied to a rear surface of the seat back results in the seat back pivoting up for the duration of time that the user drags a finger up the rear surface of the seat back;

FIG. 6 is a perspective and diagrammatic view of a vehicle seat showing that the vehicle seat has a touch-sensitive surface for receiving gesture-based inputs drawn by a user and suggests that the user can draw various gesture-based inputs to cause the gesture-based adjustment system of FIG. 1 to invoke respective types of vehicle seat adjustments, including upward and downward drag gestures that cause the gesture-adjustment system to move the vehicle seat longitudinally, hook gestures that cause the gesture-adjustment system to pivot a seat back of the vehicle seat, and multi-touch gestures that cause the gesture-adjustment system to move pairs of vehicle seats at the same time;

FIG. 7 is a view of a vehicle seat showing illustrative locations of the sensors of FIG. 2 including a sensor located near a front surface of a seat bottom of the vehicle seat, a sensor centrally located within the seat bottom, sensors located on left and right sides of the seat bottom, a sensor located in an upper portion of a seat back of the vehicle seat, a sensor located in a lower portion of the seat back of the vehicle seat, and sensors located on left and right sides of the seat back of the vehicle seat;

FIG. 8 is a diagrammatic view of the processing signals step, the identifying gesture-determining characteristics step, and the determining intended gestures step of the gesture-adjustment process of FIG. 2 showing that the processed signals are reflective of the amount of pressure a user applies to a surface of a vehicle seat, the identifying gesture-determining characteristics step includes detecting, counting, and measuring heights and widths of load spikes in a received signal, and the determining intended gestures step includes querying a database to find load profiles representative of the gesture-determining characteristics to retrieve an intended gesture;

FIG. 9 is a diagrammatic view of the mapping gestures to adjustments step of the gesture-adjustment process of FIG. 2 showing that the gesture-controller maps default, pre-programmed gestures to respective vehicle seat adjustments and maps other user-configurable gestures to respective preset vehicle seat adjustments;

FIG. 10 is a diagrammatic view of a second embodiment of a gesture-adjustment system in accordance with the disclosure similar to that shown in FIG. 2, but also including a vehicle status indicator, a gesture-mode selector that selects a gesture-mode responsive to outputs of the vehicle status indicator, a passenger detector for detecting whether passengers are occupying any of the vehicle seats, and a resistance detector that detects cargo or passengers that are obstructing the motion of the vehicle seat;

FIG. 11 is a diagrammatic view of a vehicle status detection process and a gesture mode selection process in accordance with the disclosure showing that the vehicle status detection process includes the steps of detecting the status of vehicle doors and detecting vehicle speed and showing that the gesture mode selection process includes steps for determining whether the gesture-adjustment system should operate in transit-mode, cargo-loading mode, or passenger-entry mode;

FIG. 12A is a rear perspective view of a vehicle suggesting that the gesture-adjustment system is operating in a cargo-loading mode and is configured to slide a second-row vehicle seat forward longitudinally in response to application by cargo of a forward-motion gesture onto a rear surface of a seat back of the second-row vehicle seat during loading of the cargo;

FIG. 12B is a view similar to FIG. 12A showing the second-row vehicle seat moved forward longitudinally toward the first-row vehicle seats after the cargo has applied a forward-motion gesture onto the rear surface of the seat back of the second-row vehicle seat and suggesting that the gesture-adjustment system pivots the seat back of the second-row vehicle seat down in response to a further forward-motion gesture applied by the cargo onto a rear surface of the seat back;

FIG. 12C is a view similar to FIGS. 12A and 12B showing the seat back of the second-row vehicle seat pivots down toward the seat bottom to allow the cargo to be further inserted into the vehicle trunk and partially stowed on top of the second-row vehicle seat;

FIG. 13 is a diagrammatic view of a vehicle seat in which the disclosed gesture-adjustment system and methods can be implemented, the vehicle seat having a seat bottom rotationally coupled to a seat back, the seat bottom coupled to a track mounted to the floor to guide forward and backward movement of the vehicle seat, a recline motor to operate angular motion of the seat back with respect to the seat bottom, a slide motor to operate forward and backward movement of the vehicle seat and a sensor unit to detect user-gestures for input into a gesture-controller to produce seat adjustments; and FIG. 14 is a diagrammatical representation of a computerized gesture-adjustment system for vehicle seats, in which sensors accept user-gesture inputs and processors evaluate the sensor input using method steps and a database stored in computer memory, the processors then transmit a signal to an actuation unit to produce the intended vehicle seat adjustment.

DETAILED DESCRIPTION

A gesture-adjustment system 12 in accordance with the disclosure may be used initiate vehicle seat adjustments in a vehicle 5. Seat adjustments are triggered by user-gestures, such as tapping on and or swiping across a seat back 21a, for example. Sensors 30 disposed within or on vehicle seats 21 detect the user-gestures, which are associated with particular seat adjustments.

First, the type of user's intended gesture is determined. Sensors 30 included in the gesture-adjustment system 12 produce signals having characteristics associated with specific gestures. These characteristics are evaluated to identify the intended gesture. By way of example, a force sensor signal may be characterized by certain load spike parameters such as magnitude, duration, and count. In illustrative embodiments, a signal generated by a single tap gesture is characterized by a single load spike, whereas a double tap gesture produces two load spikes. Illustratively, a press-and-hold gesture is characterized by a load spike with a relatively long duration as compared to a tapping gesture.

Next, the gesture-adjustment system 12 determines the seat adjustments corresponding to the intended gesture. A database 59 containing gesture types and their corresponding seat adjustments is used to map intended gestures to seat adjustments, including the degree of change to the seat position. Gesture types and their associated seat adjustments can be pre-programmed or users may customize the system by adding additional gesture types with corresponding adjustments.

Some gesture types will adjust seats 21 to any of a number of memory positions. Other gesture types may initiate seat adjustments that continue until the gesture is completed, such as a press-and-hold gesture.

One example of a gesture-adjustment system 12 in accordance with the disclosure includes different modes of system operation to further tailor seat adjustments to the user's situation. Operation modes may include passenger entry, cargo loading and transit for when the vehicle is in operation. These modes are determined by the system 12, for example, by detection of an open passenger door or cargo hatch, and are included in the system's analysis of the desired seat adjustment. Sensors 30 may also be incorporated into the system 12 to detect the presence of passengers 15 and cargo 34. Detection of these objects can be factored into the adjustments generated by the system.

Figure 1A:
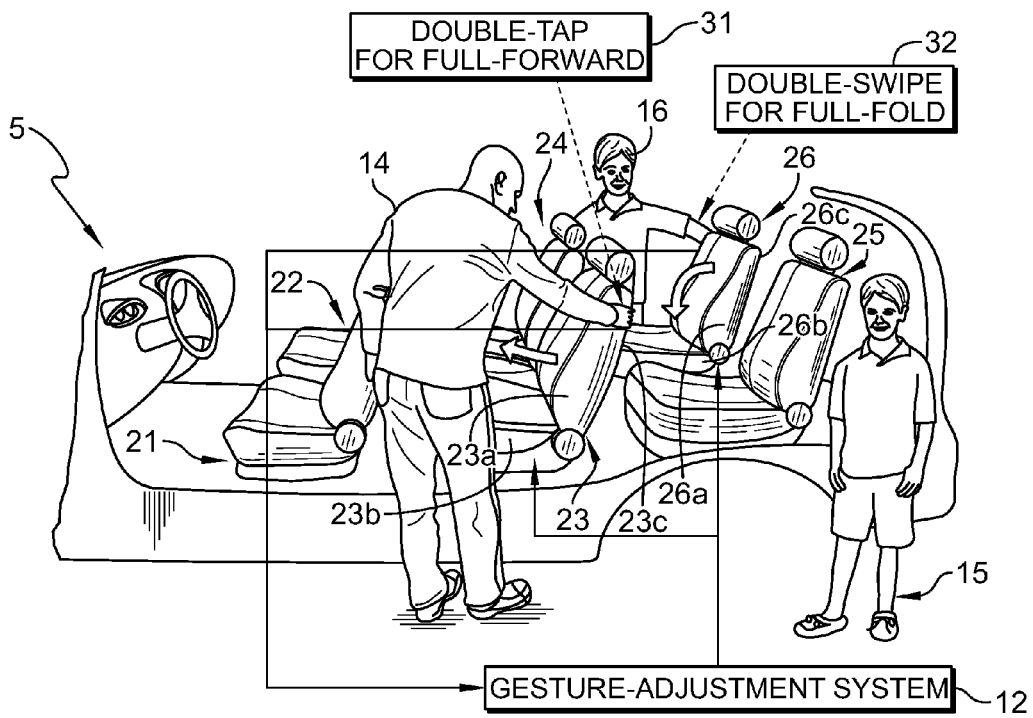
Figure 1B:
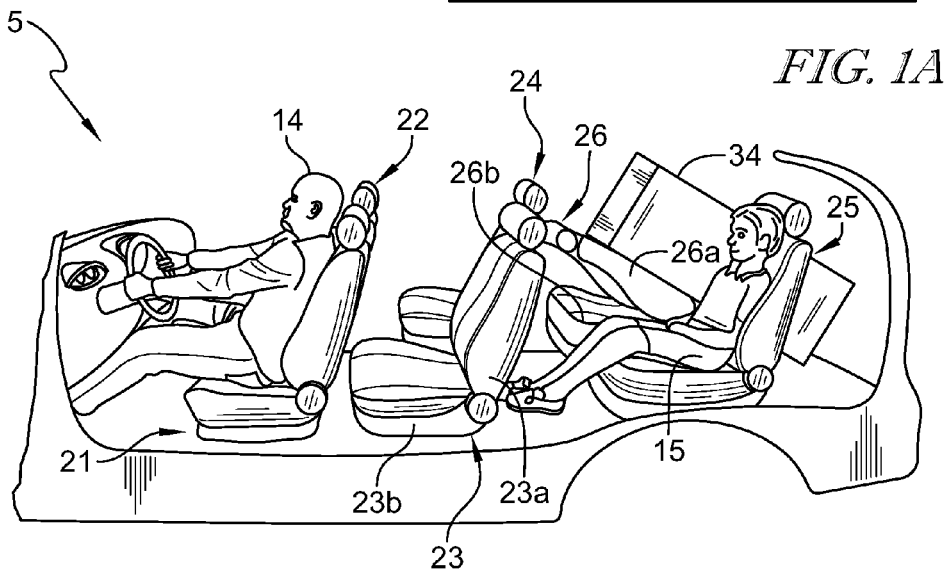

One example of a gesture-controlled seat adjustment system 12 in accordance with the disclosure is shown in FIGS. 1A and 1B. Gesture-adjustment system 12 adjusts seats 21, 22, 23, 24, 25, 26 of a vehicle 5 to positions and orientations desired by users 14, 16 based on the user's gesture-initiated inputs, according to gesture-adjustment process 10 as show, for example, in FIG. 2. Gestures are user inputs to the system 12 such as tap, swipe, press-and-hold, or other user motion that gesture-adjustment system 12 can sense and process to effectuate seat adjustments. The term tap is used broadly and may include applications of various amounts of pressure applied by the user over a relatively short period of time. In one example, the gesture-adjustment system 12 accepts gesture-based inputs on front, rear, or side surfaces of vehicle seat backs or vehicle seat bottoms.

A block diagram of a gesture-adjustment system 12 that carries out gesture-adjustment process 10 is show, for example, in FIG. 2. Adjustment system 12, via gesture-controller 35, receives gesture-initiated signals from sensors 30 in block 52 and processes the signals in step 54. Gesture-adjustment system 12 identifies gesture-determining characteristics in block 56 and based on those characteristics determines the intended gesture in step 58, distinguishing the gesture from other possible user inputs. A database 59 or lookup table may be included containing gesture-types and their corresponding characteristics. Each gesture type may be identified by finite characteristics, a range of characteristics, or a combination of characteristics. For example, a range of load spike magnitudes may be a characteristic of a particular gesture.

Once identified, the intended gestures are mapped to vehicle seat adjustments in step 60 of gesture-adjustment process 10. The adjustment signals are encoded in step 62 for transmission in step 64 to actuation unit 40, thereby implementing the desired vehicle seat adjustments.

Actuation unit 40 controls the movement of the seat and various individual parts to achieve desired adjustments. Actuation unit 40 comprises one or more electric actuators run by one or more power sources that may be, for example, the primary vehicle battery or power sources dedicated to the actuation unit or individual actuators. Actuation unit 40 includes or is interfaced with electrical circuitry programmed to operate actuation unit 40 to initiate desired motion. Actuation unit 40 can move seat bottoms 21b, 22b, 23b, 24b, 25b, 26b forward or backward longitudinally. As used herein, longitudinal motion is movement along a portion of a line extending between the front and the back of the vehicle 5. Actuation unit 40 may also pivot seat backs 21a, 22a, 23a, 24a, 25a, 26a down toward and away from seat bottoms 21b, 22b, 23b, 24b, 25b, 26b. In the illustrative embodiment shown in FIG. 2, all adjustments described apply to each seat depicted. In further examples, not all seats include every designated adjustment.

Methods of initiating adjustments by a user's gestures are show, for example, in FIGS. 3A-3C, FIGS. 1A-1B, and FIG. 2. Seats depicted in broken lines in FIGS. 3A-3C indicate memory positions, which are discrete positions programmed into gesture-adjustment system 12. Seats shown in solid lines in FIGS. 3A-3C indicate the beginning and ending positions of the vehicle seat after a user-gesture is applied.

User 14 is shown, for example in FIG. 1A, applying a double-tap gesture 31 to a rear surface 23c of seat back 23a of second-row vehicle seat 23 to move second-row vehicle seat 23 forward longitudinally to its maximum forward position. This is further suggested by way of illustration in FIG. 3B wherein the double arrow with straight shafts indicates that rear surface 23c of seat back 23a is tapped twice, causing movement from linear memory position P1, through linear memory positions $P_2$ to $P_4$, and coming to rest at the forward limit position $P_5$. This will better accommodate passenger 15 who seeks to enter vehicle 5 and occupy third-row vehicle seat 25 as shown in FIG. 1B.

Gesture-adjustment system 12 may be configured to respond differently to distinct gestures applied to the same area or sensor of the vehicle seat. A single tap on rear surface 23c of seat back 23a, depicted by a single arrow with a straight shaft, causing seat 23 to move a single increment from position $P_1$ to $P_2$ is suggested in FIG. 3A.

A user activating a sensor on rear surface 23c of seat back 23a, by applying pressure for an extended period of time results in moving vehicle seat 23 as suggested in FIG. 3C. The activated sensor moves vehicle seat 23 from position $P_1$, two increments to position $P_3$, representing the distance the seat moved during the time pressure was applied to rear surface 23c of seat back 23a. In one example, the more pressure that user 14 applies to rear surface 23c, the faster vehicle seat 23 moves forward longitudinally. This enables user 14 to control the speed with which the vehicle seat adjustment is made. Other gestures, such as a user's application of pressure in a circular motion or extended linear motion, may correspond to seat adjustments, either programmed into the system as default gestures with associated adjustments, or user-configured gestures corresponding to user-chosen adjustments, as will be explained further below.

Illustrative methods of initiating adjustments by a user's gestures applied to a front surface 23d of seat 23 are shown, for example, in FIGS. 4A-4C viewed in conjunction with FIG. 2. Seats depicted in broken lines in FIGS. 4A-4C indicate the memory positions of the vehicle seat. Seats shown in solid lines indicate the beginning and ending positions of the seat after a user-gesture is applied to the seat. These too can be memory positions.

As an illustrative example, FIG. 4A shows a single tap on front surface 23d of seat back 23a, depicted by a single arrow with a straight shaft, causing seat 23 to move a single increment from position $P_5$ rearward to position $P_4$. A double-tap gesture, illustrated by a double arrow with straight shafts, applied to a front surface 23d of seat back 23a, causing seat 23 to move from position $P_5$, through positions $P_4$-$P_2$, and coming to rest at the rear-most position $P_1$ is shown in FIG. 4B.

The result of a user activating a sensor on front surface 23d of seat back 23a for an extended period of time, i.e. a press-and-hold gesture, resulting in seat 23 moving from the forward most position $P_5$, through positions $P_4$ and $P_3$, and stopping at position $P_2$ is shown, for example, in FIG. 4C. In general, applying force for an extended period of time as compared to tapping on a surface will move the seat more than one increment. A particular length of time is associated with a certain longitudinal or angular distance. The discrete adjustments may vary with the length of time. For example, the movement associated with an initial period of maintaining pressure may be faster or slower than subsequent periods of time.

An illustrative example of equally spaced memory positions are represented in FIGS. 3A-3C and 4A-4C. The gesture-adjustment system 12, however, can be configured with un-equally spaced memory positions. Additionally, a position does not have to be changed in discrete amounts but, for example by use of a sustained gesture, such as a press-and-hold gesture, the stopping position of vehicle seat 23 can be selected at any location along a linear or rotational distance.

Gesture-adjustment system 12 is further configured to generate rotational adjustments of seat backs 21a, 22a, 23a, 24a, 25a, 26a. FIGS. 5A and 5B depict representative rotational adjustments of vehicle seat 26, but can also apply to some or all of additional vehicle seats 21, 22, 23, 24, 25. FIG. 5A shows in solid lines an illustrative example of seat back 26a fully rotated away from seat bottom 26b. It is possible though that seat back 26a can be designed to rotate further away from seat bottom 26b than shown in FIGS. 5A, 5B. In a further illustrative example, FIG. 5B shows in sold lines seat back 26a fully rotated toward seat bottom 26b. The seat positions depicted in broken lines in FIGS. 5A, 5B represent various additional rotational memory positions $R_2$, $R_3$, $R_4$ that seat 26 may occupy upon user inputs to gesture-adjustment system 12. Positions $R_1$ through $R_5$ are shown equally spaced but may vary in accordance with the disclosure.

Rotational adjustments are initiated by swiping motions as shown in FIG. 1A viewed in conjunction with FIGS. 5A and 5B. In FIG. 1A user 16 is shown in an illustrative example, applying a double swipe motion 32 to generate rotational motion of seat back 26a toward seat bottom 26b. A double swipe motion, shown as a double arrow with curved shafts 130, applied to seat back 26b is suggested in FIG. 5A. Double swipe motion 130 applied to a rear surface 26c of seat back 26a causes seat back 26a to fold a maximum amount toward seat bottom 26b by rotating about pivot 26e until seat back 26a reaches memory position $R_5$. A double swipe motion 142, which if applied to rear surface 26c of seat back 26a repositions seat back 26a to a fully extended position $R_1$ is depicted according to an illustrative example in FIG. 5B.

A single swipe 128 across a portion of seat back 26a, as indicated by a single arrow with a curved shaft, moves seat back 26a from position $R_1$ to $R_2$ in FIG. 5A. FIG. 5B suggests that a single swipe 140 applied to seat back 26a while in rotational position $R_5$, brings seat back 26a to position $R_4$. A sustained swipe 132 on rear surface 26c of seat back 26a brings seat back 26a from memory position $R_2$, through position $R_3$, to position $R_4$ as suggested in FIG. 5A. FIG. 5B shows sustained swipe 144 on rear surface 26c of seat back 26a bringing seat 26 from rotational position $R_4$, through rotational position $R_3$, stopping at rotational position $R_2$. FIG. 6 shows, for example, a variety of gesture-based inputs that a user can draw on a touch or pressure-sensitive surface 26f disposed on a rear surface 26c of seat back 26a to achieve various vehicle seat adjustments.

Rotational memory positions $R_1$-$R_5$ may be stored in a memory module of vehicle 5. As user 16 swipes downwards in swipe motion 132, such as shown in FIG. 5A, seat back 26a pivots down toward seat bottom 26b. User 16 ultimately disengages from rear surface 26c at a lower swipe point 137 of swipe gesture 132, at which time seat back 26a ceases rotational movement. In illustrative embodiments, the speed and/or amount of pressure with which user 16 applies sustained-swipe downward gesture 132 impacts the speed with which seat back 26a pivots. For example, a sustained-swipe downward gesture 132 that applies more pressure to rear surface 26c or that is relatively rapid may result in seat back 26a pivoting at a faster rate.

Examples of gesture-based inputs that gesture-adjustment system 12 may accept are shown in FIG. 6. In the illustrative embodiment of FIG. 6, vehicle seat 26 includes a capacitive touch-sensitive surface 26f disposed on rear surface 26c of seat back 26a. Touch-sensitive surface 26f is capable of accepting and resolving gestures drawn by user 16 onto touch-sensitive surface 26f. In this illustrative embodiment, when user 16 draws an upward-drag gesture 150 on touch-sensitive surface 26f, vehicle seat 26 moves forward longitudinally by a distance 151 proportional to length 150a of upward-drag gesture 150. Similarly, when user 16 draws a downward-drag gesture 152 on touch-sensitive surface 26f, vehicle seat 26 moves backward longitudinally by a distance 153 proportional to length 152a of downward-drag gesture 152. In other illustrative embodiments, the speed with which user 16 draws upward-drag gesture 150 or downward-drag gesture 152, and not lengths 150a, 152a, impacts the distances 151, 153 of longitudinal movement. In one illustrative example, a dragging motion is similar to a swiping motion but with more sustained pressure and at a relatively slower rate.

When user 16 draws a counterclockwise hook gesture 154, seat back 26a rotates downwards toward seat bottom 26b by a rotational amount proportional to the length of the counterclockwise hook gesture 154. For example, if user 16 draws a complete counterclockwise hook gesture 154 through to location 154b, vehicle seat 26 will assume a full-fold position. If user 16 draws only a partial counterclockwise hook gesture 154 by stopping at location 154a, vehicle seat 26 will assume a partially-folded position. Likewise, if user 16 draws a clockwise hook gesture 156, seat back 26a will rotate away from seat bottom 26b by a rotational amount proportional to the rotational extent of the clockwise hook gesture 156. Thus, drawing clockwise hook gesture 156 through to completion to location 156b results in vehicle seat 26 occupying a full-upright position. Drawing a partial clockwise hook gesture 156 by stopping at location 156a results in vehicle seat 26 occupying a partial-recline position. In illustrative embodiments, the speed with which user draws counterclockwise hook gesture 154 or clockwise hook gesture 156 impacts the speed with which seat back 26a pivots.

Touch-sensitive surface 26f may also resolve multiple touch points, which enables gesture-adjustment system 12 to accommodate gesture-based inputs that move more than one vehicle seat 21, 22, 23, 24, 25, 26 at a time. For example, when user 16 draws a multi-touch upward-drag gesture 158 on touch-sensitive surface 26f of vehicle seat 26, both vehicle seat 26 and its neighboring vehicle seat 25 move forward longitudinally toward vehicle seats 23, 24, respectively, a distance proportional to swipe length 158a. Similarly, when user 16 draws multi-touch downward-drag gesture 160, both vehicle seat 26 and its neighboring vehicle seat 25 move backward longitudinally a distance proportional to swipe length 160a away from vehicle seats 23, 24, respectively. Although FIGS. 5A, 5B, and 6 were described with reference to exemplary vehicle seat 26, similar gestures may be accepted in relation to any vehicle seats 21, 22, 23, 24, 25, 26.

Although FIGS. 3A-6 illustrate gesture-adjustment system 12 accepting gesture-based inputs on front and rear surfaces of seat backs 21a, 22a, 23a, 24a, 25a, 26a, gesture-adjustment system 12 may accept gesture-based inputs at other locations, as illustrated in FIG. 7 with reference to exemplary vehicle seat 26. Generally, gesture-based inputs may be accepted on any surface proximal to a sensor 30 disposed on or within vehicle seat 26. Positioning sensors where one may contact a seat to produce manual adjustments may lessen the learning curve for operation of the gesture-adjustment systems.

An example of sensors 30 disposed in vehicle seat backs 21a, 23a, 26a is shown in FIG. 2. All seats though may include sensors at the positions shown or other functional positions to generate gesture-initiated adjustments. A more detailed illustration of possible sensor locations in seat 26, including positions of sensors 30a, 30b, 30c, 30d, 30e, 30f, 30g, 30h, is provided in FIG. 7.

Upper seat back sensor 30a enables users 14, 16 to apply gesture-based inputs to an upper portion of seat back 26a, while lower seat back sensor 30d enables users 14, 16 to apply gesture-based inputs to a lower portion of seat back 26a. The sensors represented by the diagrammatical sensor blocks shown in FIG. 7 may include one or more sensors in that general location that can sense user-gestures from one or more sides. Left and right side seat back sensors 30b, 30c enable a user to apply gesture-based inputs on left and right side surfaces 26g, 26h of seat back 26a, respectively. Left and right side seat back sensors 30b, 30c may be convenient in situations when users 14, 16 have better access to left and right side surfaces 26g, 26h than rear surface 26c and front surface 26d, such as when users 14, 16 are approaching vehicle 5 from the side to load cargo onto vehicle seat 26.

Center seat bottom sensor 30e is shown, for example, centrally located within seat bottom 26b in FIG. 7. This sensor positioning may enable users 14, 16 to apply gestures directly on seat bottom 26b. Left and right side seat bottom sensors 30f, 30g enable users 14, 16 to apply gestures on left and right side surfaces 26i, 26j, of seat bottom 26b, respectively. Front seat bottom sensor 30h enables users 14, 16 to apply gestures to a front surface 26k of seat bottom 26b. Left and right side seat bottom sensors 30f, 30g and front seat bottom sensor 30h may be convenient when user 14, 16 is sitting on vehicle seat 26. When sitting on vehicle seat 26, user 14, 16 may conveniently be able to use a left hand to reach left side surface 26i, a right hand to reach right side surface 26j, or either hand to reach front surface 26k of seat bottom 26b. Left and right side seat bottom sensors 30f, 30g and front seat bottom sensor 30h may be convenient for use by a driver occupying first-row vehicle seat 21, shown in FIGS. 1 and 2, to apply gesture-based inputs without removing his or her eyes from the road.

Multiple sensors may activate a single motion. For example, a seated occupant may move a seat forward or backward with a sensor on the seat's side but when entering the vehicle may generate the same seat motion by a sensor on the seat back.

In addition to capacitive touch-sensitive surfaces described above, other types of sensors 30 may be used, such as load cells. Further examples include heat-activated sensors, proximity sensors, motion-based sensors or resistance detectors. In illustrative embodiments, gesture-adjustment system 12 includes an optical detector, such as a camera, that collects image data regarding actions taken by users 14, 16 and implements gesture-detection techniques to determine which gestures users 14, 16 are performing.

In illustrative examples, sensors 30 may also include audio detectors that receive audio commands, such as voice commands, to implement vehicle seat adjustments. Sensors 30 need not be disposed on or in vehicle seats 21, 22, 23, 24, 25, 26 but may instead be located on other surfaces within vehicle 5, such as a center stack or incorporated into a door. Sensors 30 may also be disposed on separate hardware such as a tablet computer, and may include a touch screen interface of a mobile computing device.

In response to accepting gesture-based inputs, gesture-adjustment process 10 may proceed to a processing step 54, which processes signals from sensors 30 reflecting the gesture-based inputs as suggested in FIG. 2 and FIG. 8. In one illustrative example, sensors 30 are load cells or other force sensors that generate electrical signals in proportion to a detected magnitude of force. Thus, when user 14 applies pressure to a rear surface 23c or a front surface 23d of seat back 23a, the associated force is detected by sensors 30. Application of pressure may be directly to sensors 30 or through intervening materials from which vehicle seat 23 is fabricated. In response, sensors 30 transmit electrical signals reflecting the amount of force applied by user 14, to one or more processors to characterize and identify the gestures, and further to map them to an adjustment via lookup table 120, encode them and transmit them to actuation unit 40 to carry out the intended adjustment. Gesture adjustment process 10 may also include steps to improve signal quality and remove noise, such as through use of filters, amplifiers, and other signal modifying components that improve or alter performance of gesture-adjustment system 12.

Turning to FIG. 8, when a user applies a gesture such as single tap gesture, as suggested, for example, in FIGS. 3A and 4A, sensor 30 may transmit electrical signal 82. Electrical signal 82 is depicted as a function of time, and may be an output of sensor 30 (e.g. current or voltage). Signal 82 includes a single load or force spike 82a corresponding to the point in time during single-tap gesture when the pressure applied by the user to sensor 30 reaches a relative maximum. When the user applies double-tap gesture, as suggested for example in FIGS. 3B and 4B, sensor 30 may transmit signal 84, as shown in FIG. 8. Signal 84 includes two load spikes 84a, 84b corresponding to the two points in time during double-tap gesture when the pressure applied by the user to a seat back, for example, reaches relative maxima. When the user applies press-and-hold gesture, such as that which is suggested in FIGS. 3C and 4C, sensor 30 may transmit signal 86, which includes a load spike 86a that reveals the duration of time during which the user applies continuous pressure to sensor 30 as width $w_1$. Load spike 86a for signal 86 has a width $w_1$ that is greater than $w_1$ for load spikes 82a, 84a evidencing the extended time during which the user applies pressure to, or otherwise activates, sensor 30 by a press-and-hold gesture.

Where gesture-adjustment system 12 accepts gesture-based inputs having spatial components, such as swiping gestures 128, 130, 132, 140, 142, 144 illustrated in FIGS. 5A and 5B or drag gestures 150, 152, 154, 156, 158, 160 illustrated in FIG. 6, sensors 30 may be configured to generate signals (not shown) reflecting the pressure applied by the user as both a function of time and space. For example, sensors 30 may include an array of load cells, with different load cells among the array responsible for measuring pressure at different respective spatial locations. Likewise, capacitive touch-sensitive surface 26f may generate signals reflecting touch inputs as a function of time and space.

After signal processing step 54, gesture-controller proceeds to identifying step 56, shown for example in FIGS. 2 and 8 in which gesture-controller 35 identifies gesture-determining characteristics within received signals 82, 84, 86 that gesture-controller 35 can use to distinguish among different gesture-based inputs. Gesture-determining characteristics may include the number of load spikes in received signals 82, 84, 86 to identify the number of taps for example, the respective heights of load spikes in received signals 82, 84, 86 to identify the force magnitude, and the respective widths of load spikes in received signals 82, 84, 86 to identify the time over which the gesture is applied. Information from signals from more than one sensor, such as would be present in a sensor array, can be combined to evaluate the type of gesture.

As shown, for example, in FIG. 8, identifying step 56 includes a series of sub-steps. The gesture identification process begins with detecting step 92, in which gesture-controller 35 detects load spikes 82a, 84a, 84b, 86a in received signals 82, 84, 86. For example, gesture-controller 35 may include differentiator circuitry capable of identifying relative maxima among received signals 82, 84, 86. Identifying step 56 then proceeds to counting step 94, in which gesture-controller 35 counts the number of detected load spikes, represented in FIG. 8 as N. Thus, the number of detected load spikes N is N=1 for received signal 82, N=2 for received signal 84, and N=1 for received signal 86.

Next in determining step 96, gesture-adjustment system 12 determines a height $h_n$ of each load spike for N=1 . . . N. For example, gesture-controller 35 may measure the amplitude of received signals 82, 84, 86 at the location of each load spike 82a, 84a, 84b, 86a to determine heights $h_n$. Gesture-adjustment system 12 then proceeds to determining step 98, which determines widths $w_n$ of each load spike for N=1 . . . N. For example, gesture-controller 35 may include differentiator circuitry capable of detecting when each load spike begins and ends, and may compute a time differential between those points.

Gesture-controller 35 then proceeds to determining step 58, in which gesture-controller 35 determines the gesture intended by the user based on the identified gesture-determining characteristics N, $h_n$, and $w_n$. Determining step 58 may be implemented by querying a database 59 with the identified gesture-determining characteristics N, $h_n$, and $w_n$. Database 59 may include tables and fields that correlate different load profiles with different types of gestures. Database 59 is queried with gesture-determining characteristics N, $h_n$, and $w_n$, and the gesture corresponding to that load profile is returned.

The manner by which load profiles are associated with gestures may depend on the particular gestures supported by gesture-adjustment system 12 and the characteristics of those gestures. In this example, gesture-controller 35 may determine that received signal 82 corresponds to a single-tap gesture or a press-and-hold gesture because the number of load spikes is N=1. Gesture-controller 35 may then compare the ratio of height $h_1$ of load spike 82a to width $w_1$ of load spike 82a to a predetermined ratio threshold. If the ratio exceeds the predetermined threshold, gesture-controller 35 concludes that the user applied a single-tap gesture, whereas if the ratio is below the predetermined threshold, gesture-controller 35 concludes that the user applied a press-and-hold gesture. Because single-tap gesture includes applying pressure for a relatively short amount of time, the computed ratio of $h_1$ to $w_1$ for received signal 82 will be relatively high, resulting in a determination that user 14 applied a single-tap gesture. Characteristics can each be compared individually to thresholds or ranges as opposed calculating ratios of values for comparison to thresholds.

Similarly, gesture-controller 35 may determine that received signal 84 corresponds to a double-tap gesture because the number of load spikes is N=2, and because the ratio of height $h_1$ of load spike 84a to width $w_1$ of load spike 84a and the ratio of height $h_2$ of load spike 84b to width $w_2$ of load spike 84b are both greater than a predetermined threshold, suggesting that the user applied two taps. Finally, gesture-controller 35 may determine that received signal 86 corresponds to a press-and-hold gesture because the number of load spikes is N=1 and the ratio of height $h_1$ of load spike 86a to width $w_1$ of load spike 86a is less than the predetermined threshold, suggesting that user 14 applied a press-and-hold gesture.

Gesture-controller 35 then proceeds to mapping step 60, in which gesture-controller 35 maps the intended gesture into a vehicle seat adjustment corresponding to the intended gesture, as shown by way of example in FIG. 9. Gesture-controller 35 includes a look-up table 120 that correlates different types of gestures with corresponding actions to be taken. By querying look-up table 120, gesture-controller 35 retrieves the appropriate vehicle adjustment for a given gesture-based input.

Gesture-adjustment process 10 proceeds to encoding step 62, which encodes the desired vehicle adjustment into an encoded vehicle adjustment signal as suggested in FIG. 2. For example, gesture-controller 35 may generate digital signals (not shown) in which predetermined patterns of bits correspond to particular vehicle seat adjustments. After encoding step 62, gesture-controller 35 may perform transmitting step 64, which transmits the encoded vehicle adjustment signal to actuation unit 40. Actuation unit 40 implements the vehicle adjustments in accordance with the instructions in the encoded signal. As suggested by way of example in FIG. 2, actuation unit 40 causes seat bottoms 21b, 22b, 23b, 24b, 25b, and 26b to move forward or backward longitudinally and causes seat backs 21a, 22a, 23a, 24a, 25a, and 26a to pivot down toward or up away from bottoms 21b, 22b, 23b, 24b, 25b, and 26b as appropriate in order to implement the vehicle seat adjustments in accordance with the encoded vehicle adjustment signal.

Actuation unit 40 may reposition vehicle seats 21, 22, 23, 24, 25, 26 using powered means and/or manual means. When using powered means, actuation unit 40 adjusts vehicle seats 21, 22, 23, 24, 25, 26 in accordance with vehicle seat adjustment instructions received from gesture-controller 35. Actuation unit 40 may include one or more actuators electrically connected to motors coupled to vehicle seats 21, 22, 23, 24, 25, 26. Upon receipt of instructions regarding vehicle adjustments from gesture-controller 35, actuation unit 40 encodes and transmits vehicle seat adjustment instructions to the actuators which power the motors. The motors operate to adjust vehicle seats 21, 22, 23, 24, 25, 26 as appropriate, including to slide seat bottoms 21b, 22b, 23b, 24b, 25b, and 26b forward or backward longitudinally and to rotate seat backs 21a, 22a, 23a, 24a, 25a, and 26a. The one or more actuators contained in actuation unit 40 may be connected to different motors.

Actuation unit 40 may also operate through manual means facilitated by selectively releasable locking mechanisms 89. In such exemplary implementations, gesture-controller 35 transmits vehicle adjustments to actuation unit 40, but actuation unit 40 does not automatically adjust vehicle seats 21, 22, 23, 24, 25, 26 in accordance with the vehicle adjustments. When users 14, 16 arrive at vehicle 5, users 14, 16 manually adjust vehicle seats 21, 22, 23, 24, 25, 26 to accommodate appropriate vehicle seat adjustments. In such embodiments, actuation unit 40 may include selectively releasable locking mechanisms 89 powered by respective actuators that can occupy open and locked positions. In open positions, seat backs 21a, 22a, 23a, 24a, 25a, 26a are permitted to recline forward or backward, and seat bottoms 21b, 22b, 23b, 24b, 25b, 26b are permitted to slide longitudinally forward or backward. After users 14, 16 adjust vehicle seats 21, 22, 23, 24, 25, 26 to positions in accordance with the vehicle adjustments computed by gesture-controller 35, the locking mechanisms 89 engage in a locked position to block further adjustment. When manual adjustments are part of the process, vehicle 5 may instruct users 14, 16 by a display for example, on how to adjust vehicle seats 21, 22, 23, 24, 25, 26. Gesture-controller 35 receives signals generated by gestures made by users 14, 16 that correspond to the desired adjustments. Gesture-adjustment system 12 then provides instructions on how vehicle seats 21-26 should be adjusted to achieve the vehicle seat adjustments computed by gesture-controller 35. Users 14, 16 may follow the displayed guidance until the selectively releasable locking mechanisms 89 engage in locked positions.

Actuation unit 40 may also operate through manual means that do not include selectively releasable locking mechanisms 89, such as illustrated in FIG. 13. Where vehicle 5 operates through manual means, vehicle 5 may still include a display that provides guidance to users 14, 16 on how each of vehicle seats 21, 22, 23, 24, 25, 26 should be adjusted to align with vehicle seat adjustments computed by gesture-controller 35. Users 14, 16 may follow displayed guidance until vehicle seats 21, 22, 23, 24, 25, 26 are properly adjusted. Vehicle 5 may alert users 14, 16 in response to vehicle seats 21, 22, 23, 24, 25, 26 being properly adjusted, such as through a visual notification on the display or through an audio notification.

A portion of gesture-adjustment process 10 in which gestures are identified and mapped to corresponding adjustments is shown FIG. 9. Gesture-adjustment process 10 includes a look up table 120 of gestures characterized as default gestures 122 or user configurable gestures 124. Default gestures 122 can be pre-programmed into gesture-adjustment system 12, and thus can be present at the time of distribution of vehicle 5 or gesture-adjustment system 12 or a portion thereof.

User-configurable gestures 124 may include gestures programmed by a user to achieve desired preset vehicle seat adjustments. For example, a user may program a particular gesture to correspond to an interior cleaning accommodation preset 124a. The user implements steps to configure the gesture-adjustment system 12 to recognize user-programmed gestures and associate them with seat adjustments. Interior cleaning accommodation preset 124a may move all vehicle seats 21, 22, 23, 24, 25,26 to full-forward longitudinal positions and all seat backs 21a, 22a, 23a, 24a, 25a, 26a to full-fold positions to better accommodate accessibility for vacuums and other cleaning equipment within the interior of vehicle 5.

As another example, a user may program gesture-adjustment system 12 with a different gesture to correspond to an infant seat accommodation preset 124b. Infant seat accommodation preset 124b may move front-row vehicle seat 22 to a longitudinally forward position to accommodate placement of an infant child safety seat (not shown) on second-row vehicle seat 24.

As still another example, a user may program the system with a different gesture to correspond to a passenger entry accommodation preset 124c. Passenger entry accommodation preset 124c may move first-row vehicle seats 21, 22 forward longitudinally to accommodate passenger entry into second-row vehicle seats 23, 24. Passenger entry accommodation preset 124c may also fold down first-row seat backs 21a, 22a to accommodate passenger entry into second-row vehicle seats 23, 24.

A user may select any suitable gestures to correspond to accommodation presets 124a-c, provided the system can detect and identify them. For example, a user may select any particular sequences of taps, press-and-holds, swipes, or other gesture types as corresponding to respective accommodation presets 124a, 124b, 124c. Gesture-adjustment system 12 may include a user interface (not shown) that enables a user to select an accommodation preset 124a, 124b, 124c to configure. In response to selecting an accommodation preset 124a, 124b, 124c to configure, the user interface may prompt the user to perform a desired gesture to associate with the selected accommodation preset 124a, 124b, 124c. The user may then perform a desired gesture—e.g., double-tap followed by a press-and-hold, triple-tap, or other form or combination of gestures. Gesture-adjustment system 12 may then store and associate the performed gesture in look-up table 120 with the selected accommodation preset 124a, 124b, 124c, such that when the user subsequently performs that gesture, one or more vehicle seats 21, 22, 23, 24, 25, 26 will be adjusted in accordance with the selected accommodation preset 124a, 124b, 124c. In this manner, the user can select a suitable gesture-based input to correspond with any predetermined arrangement of vehicle seats.

Although three accommodation presets are shown in FIG. 9, gesture-adjustment system 12 and look-up table 120 can be configured to include addition accommodation presets. For example, a user may have a particular type of cargo (e.g., a bulky musical instrument) that requires the user to arrange vehicle seats 21, 22, 23, 24, 25, 26 in a particular arrangement on a regular basis. Gesture-adjustment system 12 may enable the user to arrange vehicle seats 21, 22, 23, 24, 25, 26 in a desired manner to accommodate the musical instrument, and then enable the user to program that arrangement of vehicle seats 21, 22, 23, 24, 25, 26 as an additional, customized accommodation preset (e.g., a musical instrument accommodation preset.) Having created a new customized accommodation preset, the user can proceed to program a particular gesture sequence to correspond to the customized accommodation preset as described above. The customized accommodation preset and the associated user-configured gesture sequence may then be stored in look-up table 120.

A second illustrative embodiment of a gesture-adjustment system 112 is shown in FIGS. 10-12C. Gesture-adjustment system 112 is similar to the gesture-adjustment system 12 of FIGS. 1A-9, but also includes components that support additional functionality. In particular, gesture-adjustment system 112 includes passenger detectors 115 incorporated into the system to prevent vehicle seats 21, 22, 23, 24, 25, 26 from moving when occupied by passengers and resistance detectors 114 functionally integrated into the system to prevent vehicle seats 21, 22, 23, 24, 25, 26 from damaging cargo 116 located in the movement path of vehicle seats 21, 22, 23, 24, 25, 26.

Gesture-adjustment system 112 also includes vehicle status indicator 164 and gesture mode selector 166 for factoring the current status of vehicle 5 into gesture-adjustment system so adjustments are appropriate for the current status. Gesture-adjustment system 112 can operate in a variety of modes, including for example, transit-mode, passenger-entry mode, and cargo-loading mode.

In illustrative embodiments, gesture-adjustment system 112 disables all or some of vehicle seat adjustments for vehicle seats 21, 22, 23, 24, 25, 26 that are occupied by passengers. Gesture-adjustment system 112 detects passengers using passenger detector 115, which may detect whether passengers are located in vehicle seats 21, 22, 23, 24, 25, 26 by obtaining readings from seat bottom sensor 30e, shown in FIGS. 7 and 10, or by other sensing means. Although FIG. 10 shows illustrative seat bottom sensor 30e disposed in vehicle seat 21, it should be understood that all vehicle seats 21, 22, 23, 24, 25, 26 may include a seat bottom sensor 30e that communicates to passenger detector 115.

Passenger detector 115 is coupled with actuation unit 40 as shown for example in FIG. 10. In response to detecting that a passenger is occupying one or more vehicle seats 21, 22, 23, 24, 25, 26, passenger detector 115 may encode and communicate signals to actuation unit 40 indicating which vehicle seats 21, 22, 23, 24, 25, 26 are occupied. In response, actuation unit 40 may prevent actuation of vehicle seats 21, 22, 23, 24, 25, 26 that are occupied by temporarily disabling actuation unit 40.

Gesture-adjustment system 112 may also prevent damage or injury to obstructions, such as cargo or passengers, located within movement paths of vehicle seats 21, 22, 23, 24, 25, 26 by detecting the obstructions with resistance detectors 114 and stopping actuation of vehicle seats 21, 22, 23, 24, 25, 26 in response.

Gesture-adjustment system 112 detects obstructions through resistance detectors 114, which may detect obstructions by obtaining readings from lower seat back sensor 30d, shown, for example, in FIGS. 7 and 10. As vehicle seat 23 is moved backward longitudinally, cargo 116 applies pressure on lower seat back sensor 30d, which transmits readings to resistance detector 114 as shown, for example, in FIG. 10. In response, resistance detector 114 determines that an obstruction lies in the movement path of vehicle seat 23. Although FIG. 10 illustrates operation of resistance detector 114 with reference to cargo 116, resistance detector 114 may operate similarly with respect to feet or legs of a passenger or other obstacle on, or in the vicinity of, vehicle seat 25.

Although FIG. 10 shows illustrative lower seat back sensor 30d disposed in vehicle seat 23, it should be understood that all vehicle seats 21, 22, 23, 24, 25, 26 may include lower seat back sensors 30d that communicate with resistance detector 114. Moreover, other suitable locations for resistance detectors may be used, including sensors disposed in seat bottoms 21b, 22b, 23b, 24b, 25b, 26b.

Similarly to passenger detector 115, resistance detector 114 is communicatively coupled with actuation unit 40, as shown in FIG. 10. In response to detecting an obstruction along a movement path of vehicle seats 21, 22, 23, 24, 25, 26, resistance detector 114 may encode and communicate signals to actuation unit 40 indicating which vehicle seat 21, 22, 23, 24, 25, 26 is being obstructed. In response, actuation unit 40 may disable actuation of movement of the vehicle seats being obstructed. In one example, actuation unit 40 moves vehicle seats 21, 22, 23, 24, 25, 26 until such time that obstructions, such as cargo 116, are abutted by a seat but not squeezed.

Turning to FIG. 11, gesture-adjustment system 112 includes a vehicle status indicator 164 for determining a vehicle status and a gesture mode selector 166 for determining a mode of operation for gesture-controller 35. Vehicle status indicator 164 performs vehicle status detection process 168. Vehicle status detection process 168 includes a detecting step 170 for detecting the status of vehicle passenger doors (not shown) and vehicle hatch door 7 (shown in FIG. 10), including a detection of whether each of the vehicle passenger doors are open or closed and whether hatch door 7 is open or closed. Vehicle status detection process 168 proceeds to detecting step 172, in which detects the speed of vehicle 5. In one example, vehicle status detection process 168 detects other aspects of the status of vehicle 5, including the manner by which vehicle 5 is operating in the environment of vehicle 5.

Gesture mode selector 166 performs gesture mode selection process 176, also shown, for example, in FIG. 11. Gesture mode selection process 176 begins with determining step 178, in which gesture mode selector 166 determines whether vehicle 5 is moving based on the results of detecting step 172, performed by vehicle status indicator 164. In response to a determination that vehicle 5 is moving, gesture mode selection process 176 proceeds to operating step 180, in which gesture-adjustment system 112 is operated in a transit mode.

In response to a determination that vehicle 5 is not moving, gesture mode selection process 176 proceeds to operating step 182, in which gesture-adjustment system 112 is operated in either a passenger-entry mode or a cargo-loading mode. To determine which of these modes to use, gesture mode selection process 176 proceeds to determining step 188, in which whether hatch door 7 is open is determined based on the results of detecting step 170 performed by vehicle status indicator 164. In response to a determination that hatch door 7 is not open, gesture mode selection process 176 proceeds to operating step 190, in which gesture-adjustment system 112 is operated in passenger-entry mode. In response to a determination that hatch door 7 is open, gesture mode selection process 176 proceeds to operating step 192, in which gesture-adjustment system 112 is operated in cargo-loading mode.

Gesture-controller 35 may associate different types of gestures with different respective vehicle adjustments based on whether gesture-adjustment system 112 is operated in passenger-entry mode, cargo-loading mode, or transit mode. For example, when operating in passenger-entry mode, gesture-adjustment system 112 may associate gestures with vehicle adjustments in the manner suggested look up table 120 shown in FIG. 9. However, when in cargo-loading mode, gesture-adjustment system 112 may accept gesture-based inputs that are more applicable for users 14, 16 that are loading cargo into vehicle 5.

A cargo-loading mode for gesture-adjustment system 112 is illustrated in FIGS. 12A-12C. In a cargo-loading mode, gesture-adjustment system 112 may accept gesture-based inputs generated by movement of cargo 202 and may perform vehicle adjustments that are tailored to facilitate cargo loading. Thus, in a method of operation in accordance with a cargo-loading mode, user 14 inserts cargo 202 into hatch 6. In the depicted configuration, seat backs 25a, 26a of third-row vehicle seats 25, 26 have already been pivoted down such that third-row vehicle seats 25, 26 assume folded positions. Cargo 202 abuts rear surface 23c of seat back 23a of second-row vehicle seat 23 and applies pressure to seat back 23a. In response, second-row vehicle seat 23 is moved forward longitudinally toward first-row vehicle seat 21, as suggested, by way of example, in FIG. 12A. This forward longitudinal movement of second-row vehicle seat 23 allows cargo 202 to be inserted into hatch 6 of vehicle 5.

If cargo 202 requires still further space in order to fit within vehicle 5, user 14 may use cargo 202 to apply continued pressure to rear surface 23c. Vehicle seat 23 will ultimately reach a full-forward position. In response to still continued pressure applied by cargo 202 to rear surface 23c as suggested in FIG. 12B, seat back 23a of vehicle seat 23 may pivot down toward seat bottom 23b to a full-fold position, as shown, for example, in FIG. 12C. If there is insufficient longitudinal clearance for seat back 23a to pivot down toward seat bottom 23b (e.g., if head rest of vehicle seat 23 is blocked by seat back 21a of vehicle seat 21), gesture-adjustment system 112 may move vehicle seat 23 longitudinally backward to provide the necessary clearance to allow seat back 23a to pivot down to a full-fold position. Thus, vehicle seat 23 is arranged within vehicle 5 to allow cargo 202 to be stowed on top vehicle seat 23 as suggested in FIG. 12C.

As shown, when operating in cargo-loading mode, gesture-adjustment system 112 may perform different types of vehicle adjustments in response to different types of gesture-based inputs than in passenger-entry mode. In the illustrative example discussed above, gesture-adjustment system 112 moves one or more of vehicle seats 21-26 forward longitudinally to full-forward positions in response to continued pressure applied to rear surfaces 21c, 22c, 23c, 24c, 25c, 26c, and then pivots seat backs 21a, 22a, 23a, 24a, 25a, 26a down to full-fold positions in response to continued pressure. The double-tap gesture and double-swipe gesture 130, shown, for example, in FIGS. 3B and 5A respectively, result in similar vehicle adjustments during passenger-entry mode but would be inconvenient for cargo-loading purposes because it may be difficult to perform tapping or swiping gestures while handling bulky cargo. Thus, double-tap gesture and double-swipe gesture 130 may be enabled during passenger-entry mode, but not during cargo-loading mode, or both modes may be enabled concurrently.

Likewise, gesture-adjustment system 112 may perform different types of vehicle adjustments in response to different types of gesture-based inputs when vehicle 5 is in transit mode. During transit mode, gesture-based inputs may correspond to vehicle adjustments that promote passenger comfort rather than entry of passengers or loading of cargo. For example, users 14, 16 may occupy one of vehicle seats 21-26 and apply gestures to their vehicle seat 21, 22, 23, 24, 25, 26 to move the vehicle seat 21, 22, 23, 24, 25, 26 forward or backward longitudinally and/or to pivot seat back 21a, 22a, 23a, 24a, 25a, 26a to achieve a more comfortable position and orientation.

In one illustrative example, gesture-based inputs may be applied using other body parts of users 14, 16 other than fingers or hands. For example, users 14, 16 may lean their upper bodies backward as to apply pressure against seat back 21a, 22a, 23a, 24a, 25a, 26a, which may result in their vehicle seat 21, 22, 23, 24, 25, 26 moving backward longitudinally. Similarly, users 14, 16 may lean their bodies forward as to reduce pressure applied against their seat back 21a, 22a, 23a, 24a, 25a, 26a and increase pressure applied to a front portion of their seat bottom 21b, 22b, 23b, 24b, 25b, 26b, which may result in their vehicle seat 21, 22, 23, 24, 25, 26 moving forward longitudinally. By having a variety of locations for sensors 30a-e, examples of which are shown in FIG. 7, gesture-adjustment system 112 is capable of receiving a variety of gesture-based inputs.

Although vehicle adjustments described above included longitudinal movement of vehicle seats 21, 22, 23, 24, 25, 26 and pivoting of seat backs 21a, 22a, 23a, 24a, 25a, 26a, illustrative embodiments may include other types of vehicle seat adjustments, including vertical height adjustments of vehicle seats 21, 22, 23, 24, 25, 26 and rotational tilt of seat bottoms 21b, 22b, 23b, 24b, 25b, 26b. Still other vehicle seat adjustments may include longitudinal length or lateral width of seat cushions that are part of seat bottoms 21b, 22b, 23b, 24b, 25b, 26b, vertical height or lateral width of seat cushions that are part of seat backs 21a, 22a, 23a, 24a, 25a, 26a, bolster adjustment of vehicle seats 21-26, upper back adjustment of seat backs 21a, 22a, 23a, 24a, 25a, 26a, lumbar adjustment of seat backs 21a, 22a, 23a, 24a, 25a, 26a, and adjustment of headrests of vehicle seats 21, 22, 23, 24, 25, 26.

Likewise, vehicle adjustments may include adjustments to vehicle equipment in addition to vehicle seats 21, 22, 23, 24, 25, 26. For example, in response to gesture-based inputs, gesture-adjustment system 112 may adjust the position and/or orientation of a steering wheel, rearview mirrors, side mirrors, and other vehicle equipment. In illustrative embodiments, when users 14, 16 sitting in vehicle seats 21, 22, 23, 24, 25, 26 stretch against seat backs 21a, 22a, 23a, 24a, 25a, 26a, massaging or heating functionality of vehicle seats 21, 22, 23, 24, 25, 26 may turn on.

A vehicle seat 80 into which a vehicle seat adjustment system according to the disclosure is shown in FIG. 13. Vehicle seat 80 is mounted to a floor 81. Vehicle seat 80 can be for example, any of vehicle seats 21, 22, 23, 24, 25, 26 shown in FIGS. 1A, 1B and 2.

Vehicle seat 80 illustratively includes a seat bottom 82, a seat back 83, and a gesture-adjustment system 12. Vehicle seat 80 is coupled to a track 101 mounted to floor 81 so vehicle seat 80 can move longitudinally along floor 81 toward and away from the vehicle front 90 and the vehicle back 91. Seat back 83 extends upwardly from seat bottom 82.

Seat adjustment system 12 includes slide motor 85, a recline motor 102, a power source 87, a sensor unit 88 containing one or more sensors 30, and a gesture-controller 35 coupled to each of the other components of seat adjustment system 12. Slide motor 85 is configured to move vehicle seat 80 along floor 81, as guided by track 101, in response to a user-gesture 70. Recline motor 102 is configured to rotate seat back 83 with respect to seat bottom 82 in response to a user-gesture. Power source 87 is selectively coupled to slide motor 85 and recline motor 102 by controller 35 to move seat bottom 82 forward or backward along track 101 and rotate seat back 83 toward or away from seat bottom 82, respectively. A height motor may also be included and similarly connected to controller 35 to raise and lower seat bottom 82. Similarly, a seat bottom tilt motor can be incorporated into gesture-adjustment system 12. Recline motor 102, slide motor 85 and other motors may have separate power sources, each functionally connected to controller 35.

Sensor unit 88 detects forces applied by a user to front side 92 of seat back 83 or back side 93 of seat back 83. Seat back sensors 30 accept, for example, a rearward slide motion activation gesture 99, a forward slide motion activation gesture 94, a forward pivot motion activation gesture 95 and a recline pivot motion activation gesture 103 causing sensor unit 88 to generate corresponding signals. Controller 35 receives the signals from sensor unit 88 and activates slide motor 85 or recline motor in response. Thus, gesture-adjustment system 12 provides a means for adjusting vehicle seat 80 in response to a user-gesture, such as one that applies a force on seat back 83 at a location recognized by sensor unit 88.

The methods described above, including those carried out by gesture-controller 35, actuation unit 40, vehicle status indicator 164, gesture mode selector 166, and resistance detector 114, may be implemented by software and compiled and stored to a memory as object code. During runtime, the software may be invoked for execution by a processor. In one implementation, gesture-adjustment systems 12, 112 are implemented as single systems on a chip. The above-described components may communicate with other components in vehicle 5 through any suitable electronic communication mechanism, such as a communication bus or cabling. In other implementations, gesture-adjustment systems 12, 112 may be implemented on separate hardware modules placed in communication with one another through any suitable electronic communication mechanism, such as a communication bus or cabling. Communication may also be provided wirelessly, such as 802.11 (Wi-Fi), NFC, Bluetooth®, or other suitable technologies. Data regarding default gestures 122, user configurable gestures 124, and corresponding vehicle adjustments may be stored to memory modules. Database 59 and look-up table 120 may be implemented using any suitable database environment, for example Oracle, DB2, or SQL Server.

FIG. 14 is a diagrammatical representation of a computer system having a gesture-adjustment system 12, in which the vehicle seat adjustment methods can be implemented. User-gesture 70 is received by sensors 30. Sensors 30 generate a signal reflective of the characteristics of the user-gesture. Memory 72 includes a database 73, such as a lookup table, that stores identifiable gesture types and their associated vehicle seat adjustments. Memory 72 also stores computer code, which when executed carries out the method steps 74 necessary to identify and evaluate the characteristics of the signal supplied by the sensor and establish from the identified characteristics the intended user-gesture. Memory 72 also stores executable computer code to map the intended gesture to the corresponding vehicle seat adjustment and encode the seat adjustment signal for transmission to actuation unit 40. Processors 75 execute the computer code to carry out the aforementioned method steps.

The following clauses include embodiments that are contemplated and non-limiting. These embodiments, like other embodiments of the disclosure, pertain to a computerized system, a software-implemented method, a non-transitory computer-readable storage medium, a vehicle seat embodying any of such subject matter, and a vehicle embodying any of such subject matter.

The user-gestures may include one or more taps, swipes, press-and-holds, clockwise hooks and counterclockwise hooks.

The non-transitory computer-readable medium of the gesture-adjustment system may contain a plurality of equally spaced memory positions corresponding to incremental linear vehicle seat adjustments, angular vehicle seat adjustments or both.

One or more sensors of the adjustment system may be a force sensor that generates signals including load parameter characteristics such as load magnitude, load duration and load count.

The adjustment system may include one or more releasable seat adjustment locking mechanisms. These locking mechanisms may be manually or electronically releasable. Instructions provided electronically to users, such as on a screen, may include directions to lock or unlock at least one of the seat adjustment locking mechanisms.

The gesture-adjustment system can be configured so more than one sensor can generate a signal to initiate the same vehicle seat adjustment. For example, a seat can be moved forward by tapping a sensor on the rear side of the seat back and also by activating a sensor on the front side of the seat bottom.

A plurality of sensors may also be accessible concurrently by a user enabling the sensors to detect user-gestures and generate signals to adjust more than one seat based on the concurrently-applied user-gestures.

Various database formats may be used to store gesture types, gesture-identifying characteristics and corresponding seat adjustments. Lookup tables or other arrays will generally be effective formats.

The gesture-determining characteristics may include sensor location so, for example, a sensor identified as being located on the lower rear side of a seat back may correspond to a seat adjustment to move the seat forward longitudinally and one located on the upper rear side of the seat back may be associated with a seat back rotational adjustment.

The gesture-adjustment system may map a single gesture to a fixed rotational or linear vehicle seat adjustment, and map repeated gestures to adjustments through multiple memory positions. By way of example, a doubly repeated gesture may correspond to a seat adjustment to a maximum excursion that brings it through multiple memory positions.

Sensors may include one or more of the following sensor types: load cell, capacitive touch-sensitive surface, heat-activated sensor, proximity sensor, motion-based sensor, resistance detector, optical detector, audio detector, or accelerometer. Reference is hereby made to U.S. application Ser. No. 14/878,306 filed Oct. 8, 2015 and entitled SEAT POSITION SENSING AND ADJUSTMENT for disclosure relating to accelerometers used to detect positions and arrangements of vehicle seats, which application is hereby incorporated by reference in its entirety herein.

Various embodiments have been described, each having a different combination of elements. The disclosure is not limited to the specific embodiments disclosed, and may include different combinations of the elements disclosed or omission of some elements and the equivalents of such structures and steps.

The following numbered clauses include embodiments that are contemplated and non-limiting:

Clause 1. An adjustment system for adjusting a vehicle seat in response to a gesture applied by a user to the vehicle seat, comprising
  one or more sensors located in the vehicle seat configured to detect input provided by the user in the form of user-gestures and to generate a sensor signal reflecting characteristics of one of the user-gestures, and
  means for determining the type of user-gesture intended by the user based on characteristics of the sensor signal, mapping the determined gesture to a corresponding vehicle seat adjustment, and encoding a vehicle seat adjustment signal based on the corresponding vehicle seat adjustment, and transmitting the vehicle seat adjustment signal to an actuation unit configured to adjust the vehicle seat in accordance with the vehicle seat adjustment signal.

Clause 2. The adjustment system of any other clause or combination of clauses, wherein the means for determining the type of gesture, mapping the determined gesture to a corresponding vehicle seat adjustment, encoding the vehicle seat adjustment signal, and transmitting the vehicle adjust signal comprises
  a gesture controller having one or more processors for receiving the sensor signal from the one or more sensors and
  a non-transitory computer-readable storage medium in which is stored computer code that when executed on the one or more processors causes the adjustment system to perform the method of
  receiving input from the one or more sensors, the input based on the user-gesture,
  identifying gesture-determining characteristics in the signal,
  establishing from the identified gesture-determining characteristics the intended user-gesture,
  mapping using a database stored in the non-transitory computer-readable storage medium the intended user-gesture to the corresponding vehicle seat adjustment,
  encoding the vehicle seat adjustment signal for transmission to the actuation unit, and
  transmitting the signal to the actuation unit, thereby causing the actuation unit to initiate the corresponding vehicle seat adjustment.

Clause 3. The adjustment system of any other clause or combination of clauses, wherein the gesture-determining characteristics contain load parameters and
  a single load spike corresponds to a fixed rotational or linear vehicle seat adjustment selected from one of the memory positions,
  multiple load spikes in a single gesture correspond to adjustments through multiple memory positions, and
  two load spikes in a gesture correspond to a seat adjustment to a maximum excursion position.

Clause 4. The adjustment system of any other clause or combination of clauses, wherein the non-transitory computer-readable storage medium contains a plurality of memory positions corresponding to incremental linear vehicle seat adjustments, angular vehicle seat adjustments, or both and load magnitude corresponds to a speed of the seat adjustment and load duration corresponds to the linear or angular distance of the seat adjustment.

Clause 5. The adjustment system of any other clause or combination of clauses, wherein at least one sensor is at least one of a load cell, capacitive touch-sensitive surface, heat-activated sensor, proximity sensor, resistance detector, optical detector, motion-based sensor, audio detector, and accelerometer.

Clause 6. The adjustment system of any other clause or combination of clauses, wherein the at least one sensor is an accelerometer.

Clause 7. The adjustment system of any other clause or combination of clauses, further comprising a display, wherein the adjustment system further performs the method of
  mapping the intended user-gesture to instructions for executing manual adjustments and
  displaying on the display manual instructions to guide the user through the manual adjustments.

Clause 8. The adjustment system of any other clause or combination of clauses, further comprising
  a detector coupled to the actuation unit and configured to detect an obstruction located within a movement path of the vehicle seat and
  wherein the actuation unit is configured to stop actuation of the vehicle seat in response to receipt of a signal from the detector indicating detection of the obstruction.

Clause 9. The adjustment system of any other clause or combination of clauses, comprising a touch sensitive screen configured to detect user-gestures.

Clause 10. The adjustment system of any other clause or combination of clauses, wherein the gesture controller is programmable by the user to allow the user to add user-configured gestures and corresponding seat adjustments to the database.

Clause 11. The adjustment system of any other clause or combination of clauses, wherein a plurality of seats can be adjusted with a single gesture input.

Clause 12. The adjustment system of any other clause or combination of clauses, wherein the computer code that when executed on the one or more processors further causes the adjustment system to perform the method steps of detecting a vehicle status,
determining a mode of operation based on the vehicle status, and
determining a vehicle seat adjustment based on the mode of operation.

Clause 13. The adjustment system of any other clause or combination of clauses, wherein the mode of operation is at least one of transit mode, vehicle entering mode, and cargo loading mode.

Clause 14. A method for adjusting a vehicle seat carried out by a gesture-controller having one or more processors configured with executable instructions, the method comprising
receiving a gesture-generated signal from one or more sensors,
identifying gesture-determining characteristics in the gesture-generated signal,
establishing from the identified gesture-determining characteristics an intended user-gesture,
mapping using a database stored in a non-transitory computer-readable storage medium the intended user-gesture to a corresponding vehicle seat adjustment,
encoding a vehicle seat adjustment signal for transmission to an actuation unit, and
transmitting the vehicle seat adjustment signal to the actuation unit, thereby causing the actuation unit to initiate the corresponding vehicle seat adjustment.

Clause 15. The method of any other clause or combination of clauses further comprising
storing in the non-transitory computer-readable storage medium a plurality of memory positions corresponding to incremental linear vehicle seat adjustments, angular vehicle seat adjustments, or both and adjusting the vehicle seat to one of the memory positions.

Clause 16. The method of any other clause or combination of clauses, wherein the intended user-gesture is sensed by a force sensor and the gesture-determining characteristics include load parameters.

Clause 17. The method of any other clause or combination of clauses, wherein the load parameters include load spike magnitude and load spike duration, and the load spike magnitude corresponds to adjustment speed and load spike duration corresponds to linear or angular distance of the adjustment.

Clause 18. The method of any other clause or combination of clauses, wherein the method further comprises
detecting by a detector an obstruction to movement of the vehicle seat and
stopping by the actuation unit a seat adjustment in response to detection of the obstruction.

Clause 19. The method of any other clause or combination of clauses further comprising
receiving a user-configured gesture and
adding the user-configured gesture and a corresponding user-correlated vehicle seat adjustment to the database.

Clause 20. The method of any other clause or combination of clauses, wherein the user-configured gesture is input on a touch sensitive screen.

Clause 21. The method of any other clause or combination of clauses, including a gesture corresponding to a predetermined arrangement of a plurality of seats.

Clause 22. The method of any other clause or combination of clauses further comprising
detecting a vehicle status,
determining a mode of operation based on the vehicle status, and
determining a vehicle seat adjustment based on the mode of operation.

Clause 23. The method of any other clause or combination of clauses, wherein the mode of operation is at least one of transit mode, vehicle entering mode and cargo loading mode.

Clause 24. A vehicle comprising
a vehicle seat having a vehicle adjustment system of any other clause or combination of clauses.

Clause 25. A non-transitory computer-readable storage medium on which computer-readable instructions of a program are stored that when executed by a computer system cause the computer system to perform the method of any other clause or combination of clauses.

The invention claimed is:

1. An adjustment system for adjusting a vehicle seat in response to a gesture applied by a user to the vehicle seat, the adjustment system comprising:
one or more sensors located in the vehicle seat configured to detect input provided by the user in the form of user-gestures and to generate a sensor signal reflecting characteristics of one of the user-gestures, and
means for determining the type of user-gesture intended by the user based on characteristics of the sensor signal, including load spike magnitude, duration, and count, mapping the determined gesture to a corresponding vehicle seat adjustment, and encoding a vehicle seat adjustment signal based on the corresponding vehicle seat adjustment, and transmitting the vehicle seat adjustment signal to an actuation unit configured to adjust the vehicle seat in accordance with the vehicle seat adjustment signal.

2. The adjustment system of claim 1, wherein the means for determining the type of gesture, mapping the determined gesture to a corresponding vehicle seat adjustment, encoding the vehicle seat adjustment signal, and transmitting the vehicle adjustment signal comprises:
a gesture controller having one or more processors for receiving the sensor signal from the one or more sensors and
a non-transitory computer-readable storage medium in which is stored computer code that when executed on the one or more processors causes the adjustment system to:
receive input from the one or more sensors, the input based on the user-gesture,
identify gesture-determining characteristics in the signal,
establish from the identified gesture-determining characteristics the intended user-gesture,
map, using a database stored in the non-transitory computer-readable storage medium, the intended user-gesture to the corresponding vehicle seat adjustment,
encode the vehicle seat adjustment signal for transmission to the actuation unit, and
transmit the signal to the actuation unit, thereby causing the actuation unit to initiate the corresponding vehicle seat adjustment.

3. The adjustment system of claim 2, wherein the gesture controller is programmable by the user to allow the user to add user-configured gestures and corresponding seat adjustments to the database.

4. The adjustment system of claim 2, wherein the computer code that when executed on the one or more processors further causes the adjustment system to:
detect a vehicle status, determine a mode of operation based on the vehicle status, and determine a vehicle seat adjustment based on the mode of operation.

5. The adjustment system of claim 4, wherein the mode of operation is at least one of transit mode, vehicle entering mode, and cargo loading mode.

6. The adjustment system of claim 2, wherein the intended user-gesture is sensed by a force sensor.

7. The adjustment system of claim 2, wherein the non-transitory computer-readable storage medium in which is stored computer code that when executed on the one or more processors further causes the adjustment system to receive a user-configured gesture and add the user-configured gesture and a corresponding user-correlated vehicle seat adjustment to the database.

8. The adjustment system of claim 7, wherein the user-configured gesture is input on a touch sensitive screen.

9. The adjustment system of claim 1, further comprising a display, wherein the adjustment system further maps the intended user-gesture to instructions for executing manual adjustments and displays on the display manual instructions to guide the user through the manual adjustments.

10. The adjustment system of claim 1, further comprising:

a detector coupled to the actuation unit and configured to detect an obstruction located within a movement path of the vehicle seat and wherein the actuation unit is configured to stop actuation of the vehicle seat in response to receipt of a signal from the detector indicating detection of the obstruction.

11. The adjustment system of claim 1, further comprising a touch sensitive screen configured to detect user-gestures.

12. The adjustment system of claim 1, wherein a plurality of seats can be adjusted with a single gesture input.

13. A vehicle comprising:

a vehicle seat having a vehicle adjustment system according to claim 1.

14. An adjustment system for adjusting a vehicle seat in response to a gesture applied by a user to the vehicle seat, the adjustment system comprising:

one or more sensors located in the vehicle seat configured to detect input provided by the user in the form of user-gestures and to generate a sensor signal reflecting characteristics of one of the user-gestures, and means for determining the type of user-gesture intended by the user based on characteristics of the sensor signal, mapping the determined gesture to a corresponding vehicle seat adjustment, and encoding a vehicle seat adjustment signal based on the corresponding vehicle seat adjustment, and transmitting the vehicle seat adjustment signal to an actuation unit configured to adjust the vehicle seat in accordance with the vehicle seat adjustment signal, wherein the means for determining the type of gesture, mapping the determined gesture to a corresponding vehicle seat adjustment, encoding the vehicle seat adjustment signal, and transmitting the vehicle adjustment signal comprises:

a gesture controller having one or more processors for receiving the sensor signal from the one or more sensors and a non-transitory computer-readable storage medium in which is stored computer code that when executed on the one or more processors causes the adjustment system to:

receive input from the one or more sensors, the input based on the user-gesture, identify gesture-determining characteristics in the signal, establish from the identified gesture-determining characteristics the intended user-gesture, map, using a database stored in the non-transitory computer-readable storage medium, the intended user-gesture to the corresponding vehicle seat adjustment, encode the vehicle seat adjustment signal for transmission to the actuation unit, and transmit the signal to the actuation unit, thereby causing the actuation unit to initiate the corresponding vehicle seat adjustment, wherein the gesture-determining characteristics contain load parameters and a single load spike corresponds to a fixed rotational or linear vehicle seat adjustment selected from multiple memory positions, multiple load spikes in a single gesture correspond to adjustments through multiple memory positions, and two load spikes in a gesture correspond to a vehicle seat adjustment to a maximum excursion position.

15. The adjustment system of claim 14, wherein the non-transitory computer-readable storage medium contains a plurality of memory positions corresponding to incremental linear vehicle seat adjustments, angular vehicle seat adjustments, or both and load magnitude corresponds to a speed of the vehicle seat adjustment and load duration corresponds to the linear or angular distance of the vehicle seat adjustment.

16. The adjustment system of claim 15, wherein at least one sensor is at least one of a load cell, capacitive touch-sensitive surface, heat-activated sensor, proximity sensor, resistance detector, optical detector, motion-based sensor, audio detector, and accelerometer.

17. The adjustment system of claim 16, wherein the at least one sensor is an accelerometer.

18. An adjustment system for adjusting a vehicle seat in response to a gesture applied by a user to the vehicle seat, the adjustment system comprising:

one or more sensors located in the vehicle seat configured to detect input provided by the user in the form of user-gestures and to generate a sensor signal reflecting characteristics of one of the user-gestures, and means for determining the type of user-gesture intended by the user based on characteristics of the sensor signal, mapping the determined gesture to a corresponding vehicle seat adjustment, and encoding a vehicle seat adjustment signal based on the corresponding vehicle seat adjustment, and transmitting the vehicle seat adjustment signal to an actuation unit configured to adjust the vehicle seat in accordance with the vehicle seat adjustment signal, wherein the intended user-gesture is sensed by a force sensor and the gesture-determining characteristics include load parameters, wherein the load parameters include load spike magnitude and load spike duration, and the load spike magnitude corresponds to adjustment speed and load spike duration corresponds to linear or angular distance of the adjustment.

19. The adjustment system of claim 18, wherein the non-transitory computer-readable storage medium in which is stored computer code that when executed on the one or more processors further causes the adjustment system to detect by a detector an obstruction to movement of the vehicle seat and stop by the actuation unit a seat adjustment in response to detection of the obstruction.

20. The adjustment system of claim 19, wherein the non-transitory computer-readable storage medium in which is stored computer code that when executed on the one or more processors further causes the adjustment system to detect a vehicle status, determine a mode of operation based on the vehicle status, and determine a vehicle seat adjustment based on the mode of operation.

21. The adjustment system of claim 20, wherein the mode of operation is at least one of transit mode, vehicle entering mode and cargo loading mode.

\* \* \* \* \*